US012675488B2

(12) United States Patent
Purdy et al.

(10) Patent No.: US 12,675,488 B2
(45) Date of Patent: Jul. 7, 2026

(54) CYGRAPH GRAPH DATA INGEST AND ENRICHMENT PIPELINE

(71) Applicant: The MITRE Corporation, McLean, VA (US)

(72) Inventors: Stephen F. Purdy, Springfield, VA (US); Steven E. Noel, Woodbridge, VA (US); Edward A. Overly, Oak Hill, VA (US); Annie T. O'Rourke, Red Bank, NJ (US)

(73) Assignee: The MITRE Corporation, McLean, VA (US)

( * ) Notice: Subject to any disclaimer, the term of this patent is extended or adjusted under 35 U.S.C. 154(b) by 148 days.

(21) Appl. No.: 17/459,661

(22) Filed: Aug. 27, 2021

(65) Prior Publication Data

US 2023/0065398 A1 Mar. 2, 2023

(51) Int. Cl.
| | |
|---|---|
| *G06F 16/2455* | (2019.01) |
| *G06F 11/32* | (2006.01) |
| *G06F 16/2453* | (2019.01) |
| *G06F 16/25* | (2019.01) |
| *G06F 16/901* | (2019.01) |
| *H04L 9/40* | (2022.01) |

(52) U.S. Cl.
CPC ...... *G06F 16/24568* (2019.01); *G06F 11/328* (2013.01); *G06F 16/24534* (2019.01); *G06F 16/258* (2019.01); *G06F 16/9024* (2019.01); *H04L 63/1433* (2013.01)

(58) Field of Classification Search
None
See application file for complete search history.

(56) References Cited

U.S. PATENT DOCUMENTS

| | | | |
|---|---|---|---|
| 7,627,900 | B1 | 12/2009 | Noel et al. |
| 7,904,962 | B1 | 3/2011 | Jajodia et al. |
| 8,775,476 | B2 | 7/2014 | Henderson |
| 10,216,902 | B2 | 2/2019 | Vesto et al. |

(Continued)

FOREIGN PATENT DOCUMENTS

| | | | |
|---|---|---|---|
| CN | 111259205 A | 6/2020 | |
| WO | WO-2017039703 A1 * | 3/2017 | ............. G06F 17/10 |

OTHER PUBLICATIONS

Bhatia et al. "Tools and Infrastructure for Supporting Enterprise Knowledge Graphs," IBM Research: 1-6.

(Continued)

*Primary Examiner* — Tony Mahmoudi
(74) *Attorney, Agent, or Firm* — Morrison & Foerster LLP

(57) ABSTRACT

Methods and systems are described for assessing a computer network using a graph model. In some instances, the methods comprise: receiving data from at least one data stream of a plurality of data streams, wherein the plurality of data streams comprise computer network data provided by one or more data brokers, and wherein the data received from different data streams of the plurality comprise different data formats; converting the data received from the at least one data stream to a common data format comprising a node or an edge; updating a graph model comprising a plurality of nodes and edges stored within a graph database according to the node or edge of the converted data; and providing a user of the computer network with a visualization of a status of the computer network.

31 Claims, 19 Drawing Sheets

(56)                    References Cited

U.S. PATENT DOCUMENTS

| | | | |
|---|---|---|---|
| 10,410,152 B2 | 9/2019 | Apshankar et al. | |
| 10,445,322 B1 | 10/2019 | Kommera et al. | |
| 10,726,070 B2 | 7/2020 | Sanchez et al. | |
| 10,860,613 B2 | 12/2020 | Jacob et al. | |
| 11,070,579 B1* | 7/2021 | Kiernan | H04L 63/20 |
| 11,256,759 B1* | 2/2022 | Chen | G06F 16/9024 |
| 2017/0006135 A1* | 1/2017 | Siebel | G06Q 10/06 |
| 2017/0060972 A1 | 3/2017 | Mchugh et al. | |
| 2017/0076092 A1* | 3/2017 | Kashyap | G06F 21/316 |
| 2017/0109907 A1* | 4/2017 | Hamedani | G06F 16/9024 |
| 2017/0289187 A1* | 10/2017 | Noel | G06F 16/9024 |
| 2018/0075159 A1* | 3/2018 | Lin | G06F 16/9024 |
| 2018/0314921 A1* | 11/2018 | Mercep | G01S 15/86 |
| 2019/0050445 A1 | 2/2019 | Griffith et al. | |
| 2019/0095472 A1* | 3/2019 | Griffith | G06F 16/2456 |
| 2019/0190927 A1* | 6/2019 | Peng | H04L 63/1425 |
| 2019/0303383 A1 | 10/2019 | Thomas | |
| 2020/0076834 A1* | 3/2020 | Ladnai | G06F 18/2178 |
| 2020/0257731 A1 | 8/2020 | Srinivas et al. | |
| 2020/0358804 A1* | 11/2020 | Crabtree | H04L 63/1433 |
| 2020/0401908 A1 | 12/2020 | Ortega et al. | |
| 2021/0248152 A1* | 8/2021 | Bastide | G06F 40/279 |
| 2022/0394082 A1* | 12/2022 | Keren | H04L 41/5096 |

OTHER PUBLICATIONS

Conti et al. "Towards a Cyber Common Operating Picture," 2013 5th International Conference on Cyber Conflict (CYCON 2013), Jun. 4-7, 2013, Tallinn, Estonia; 17 pages.

Defense Information Systems Agency (DISA). (May 22, 2017) "DISA's Big Data Platform and Analytics Capabilities," located at http://www.disa.mil/newsandevents/2016/Big-Data-Platform, visited on May 22, 2017. (2 pages).

Defense Information Systems Agency. (May 23, 2017) "Assured Compliance Assessment Solution (ACAS)," located at http://www.disa.mil/cybersecurity/network-defense/acas, visited on May 23, 2017. (4 pages).

Eifrem. (Oct. 21, 2015) "Meet openCypher: The SQL for Graphs," located at https://neo4j.com/blog/opencypher-sql-for-graphs, visited on Oct. 21, 2015. (6 pages).

Gormley, C. and Tong, Z. (2015). Elasticsearch: The Definitive Guide. M. Loukides and B. Anderson, O'Reilly Media, Inc., pp. 1-686.

Heinbockel et al. (2016). "Mission Dependency Modeling for Cyber Situational Awareness," Nato IST-148 Symposium on Cyber Defence Situation Awareness: 14 pages.

Ingols et al. "Practical Attack Graph Generation for Network Defense," 2006 22nd Computer Security Applications Conference, Dec. 11-15, 2006, Miami Beach, Florida; USA;10 pages.

Kordy et al. (Nov. 2014). "DAG-Based Attack and Defense Modeling: Don't Miss the Forest for the Attack Trees," Computer Science Review 13-14:50 pages.

Lallie et al. (Nov. 9, 2017). "An Empirical Evaluation of the Effectiveness of Attack Graphs and Fault Trees in Cyber-Attack Perception," IEEE Transactions on Information Forensics and Security 13(5): 1-13.

McGillicudy. (Apr. 3, 2017) "Flow Data is Top Source for Network Analysis," located at https://www.kentik.com/flow-data-is-top-source-for-network-analysis, visited on Jan. 8, 2026. (7 pages).

National Vulnerability Database. (Jan. 8, 2026) "NVD - National Vulnerability Database," located at https://nvd.nist. gov, visited on Jan. 8, 2026. (3 pages).

Noel et al. (Jan. 2016). "CyGraph: Graph-Based Analytics and Visualization for Cybersecurity," Cognitive Computing: Theory and Applications, Handbook of Statistics: 1-51.

Noel et al. "An Overview of MITRE Cyber Situational Awareness Solutions," NATO Cyber Defence Situational Awareness Solutions Conference, Aug. 2015, Bucharest, Romania; 1-17.

Noel et al. "Analyzing Mission Impacts of Cyber Actions (Amica)," Nato IST-128 Workshop on Cyber Attack Detection, Forensics and Attribution for Assessment of Mission Impact, Jun. 15-17, 2015 and Istanbul, Turkey; 16 pages.

Noel et al. "Big-Data Architecture for Cyber Attack Graphs," IEEE Symposium on Technologies for Homeland Security (HST), Apr. 14-16, 2015, Boston, Massachusetts, USA;6 pages.

Noel et al. "Big-Data Graph Knowledge Bases for Cyber Resilience," Nato IST-153/RWS-21 Workshop on Cyber Resilience, Oct. 23-25, 2017, Munich, Germany; 16 pages.

Noel et al. "Metrics Suite for Network Attack Graph Analytics," 9th Annual Cyber and Information Security Research Conference (CISRC), Apr. 8-10, 2014, Oak Ridge, Tennessee, USA; 4 pages.

Noel et al. "Mission-Focused Cyber Situational Understanding via Graph Analytics," 2018 10th International Conference on Cyber Conflict, May 29-Jun. 1, 2018, Tallinn, Estonia; 17 pages.

Noel. "Interactive Visualization and Text Mining for the CAPEC Cyber Attack Catalog," ACM Interactive User Interfaces Workshop on Visual Text Analytics, Mar. 29 - Apr. 1, 2015, Atlanta, Georgia, USA; 8 pages.

O'Hare et al. "A Graph-Theoretic Visualization Approach to Network Risk Analysis," IEEE Workshop on Visualization for Computer Security, Sep. 15, 2008, Cambridge, Massachusetts, USA; pp. 60-67.

Punnoose et al. "Rya: A Scalable RDF Triple Store for the Clouds," 1st International Workshop on Cloud Intelligence, Aug. 31, 2012, Istanbul, Turkey; 8 pages.

RedSeal Networks. (May 21, 2018) "RedSeal. The foundation for digital resilience." located at http://www. redsealnetworks.com, visited on Jan. 8, 2026. (5 pages).

Robinson, I., Webber, J. and Eifrem, E. (2015). Graph Databases. M. Beaugureau, O'Reilly Media, Inc., pp. 1-218.

Rodriguez et al. (Jan. 1, 2009). "Exposing Multi-Relational Networks to Single-Relational Network Analysis Algorithms," Journal of Informetrics 4(1):27 pages.

Sandia National Laboratories. (Nov. 20, 2019) "Computer & Information Sciences (Labs Accomplishments May 2017)," located at http://www.sandia.gov/news/publications/lab_accomplishments/articles/2017, visited on Nov. 20, 2019. (6 pages).

Skybox Security. (Feb. 24, 2018) "What Can Skybox Do for You?" located at http://www.skyboxsecurity.com, visited on Feb. 24, 2018. (5 pages).

Splunk. (May 31, 2017) "What Is Splunk?," located at https://www.splunk.com, visited on [May 31, 2017]. (9 pages).

Sqrrl. (Feb. 1, 2018) "What is Sqrrl?" located at https://sqrrl.com, visited on Feb. 1, 2018. (2 pages).

The Apache Software Foundation. (Jun. 2, 2017) "Apache Storm," located at http://storm.apache.org, visited on Jun. 2, 2017. (4 pages).

The Apache Software Foundation. (May 3, 2017) "Apache Accumulo," located at https://accumulo.apache.org, visited on May 3, 2017. (3 pages).

The MITRE Corporation. (Jan. 8, 2026) "Cyber Command System (CyCS)," located at http://www.mitre.org/research/technology-transfer/technology-licensing/cyber-command-system-cycs, visited on Jan. 8, 2026. (3 pages).

W3C Recommendation. (Jan. 8, 2026) "SPARQL 1.1 Query Language," located at https://www.w3.org/TR/ sparql11-query, visited on Jan. 8, 2026. (97 pages).

Wikipedia. (Jul. 19, 2011) "Host Based Security System," located at https://en.wikipedia.org/wiki/Host_Based_Security_System, visited on Jul. 19, 2011. (5 pages).

Wireshark. (May 21, 2017) "About Wireshark," located at https://www.wireshark.org, visited on May 21, 2017. (6 pages).

* cited by examiner

301

Receive Message From Data
Broker Message Queue

302

Convert Message to CyGraph Data
Ingest (Node/Edge) Format

303

Output Message to
CyGraph_Ingest Message Queue

Path Starting Constraints     Path Traversal Constraints

Path Ending Constraints

• Alerts
• Vulnerable hosts
• Untrusted traffic

• Edge types
• Traversal depth
• Directionality

• Key terrain
• Mission functions

Elements of Risk     Tuning Analytic Focus

Priority for Protection

CYGRAPH GRAPH DATA INGEST AND ENRICHMENT PIPELINE

STATEMENT REGARDING FEDERALLY SPONSORED RESEARCH OR DEVELOPMENT

This invention was made with government support under contract number W56KGU-18-D-0004 awarded by the Department of Defense (Army). The government has certain rights in the invention.

FIELD OF THE DISCLOSURE

The present disclosure relates to the analysis of cyber network vulnerability to adversarial attack. More specifically, the present disclosure relates to methods and systems for efficiently receiving and integrating data from a variety of different cyber network data sources (where the data may be received in a variety of different formats) into a graph database used to generate graph models that allow a cyber-security analyst to visualize the cyber network and assess the potential impact of vulnerabilities and adversarial attack on the functioning of the cyber network.

BACKGROUND OF THE DISCLOSURE

Computer networks are often complex, and may comprise numerous individual computing devices that communicate with one another and share data. Furthermore, computer networks may be continuously changed or updated, with computing machines added and/or removed, software patches applied, new applications installed, firewall rules changed, etc. These changes can have substantial impacts on the security and vulnerability of the computer network and the organization that employs it.

Often, simply detecting a network intrusion may not be sufficient to effectively understand and visualize how the purported attack might impact the computer network's mission critical functions. Often, the obstacle to analyzing a computer network for vulnerabilities is not the lack of network information, but rather the inability to assemble disparate pieces of network information into an overall analytical representation of situational awareness and optimal courses of action for maintaining mission readiness. Security analysts and network operators can be overwhelmed, for example, by the amount of information provided by multiple security analysis tools, with each tool providing only a limited view of the overall computer network under consideration.

Cybersecurity analysis systems for visualizing the status of complex computer networks and rapidly assessing the potential impact of network vulnerabilities and adversarial attacks often suffer from front-end limitations including, for example: (i) the difficulty of integrating data from a variety of different sources (e.g., various network sensors providing information relating to the topology of the network, the vulnerabilities of the network, client/server configurations, firewall rules, events, and mission dependency data) that often comprise different data formats, (ii) the need to write custom scripts (or rewrite existing scripts when integrating data from a new data source) to handle the reformatting of data from different data sources into the node and edge format required by the graph database, (iii) the requirement of prior knowledge of the structure of the existing graph models within the graph database in order to reformat incoming sensor data, and (iv) the sheer volume of data to be ingested for large computer networks. Furthermore, the delay inherent in processing incoming sensor data and integrating it with existing graph models in the graph database using this approach led to delays in updating graph models to reflect current computer network status.

Accordingly, there has been a need to develop novel methods for efficiently processing and ingesting data from a variety of computer network sensors or status indicator data streams into cybersecurity analysis systems that utilize graph database techniques in a manner that allows real-time (or near real-time) updates to the graph models used to visualize the computer network.

SUMMARY OF THE DISCLOSURE

Disclosed herein are methods and systems for creating a data pipeline for efficient processing and ingestion of data received from a plurality of disparate data streams into a cyber-security analysis system that utilizes graph database techniques to model a computer network and visualize the impact of adversarial attacks on the computer network.

Disclosed herein are methods for assessing a computer network using a graph model comprising: receiving data from at least one data stream of a plurality of data streams, wherein the plurality of data streams comprise computer network data provided by one or more data brokers, and wherein the data received from different data streams of the plurality comprise different data formats; converting the data received from the at least one data stream to a common data format comprising a node or an edge; updating a graph model comprising a plurality of nodes and edges stored within a graph database according to the node or edge of the converted data; and providing a user of the computer network with a visualization of a status of the computer network.

In some embodiments, the data received from the at least one data stream is received on an intermittent basis. In some embodiments, the data received from the at least one data stream comprises data indicating a present state of the computer network. In some embodiments, the plurality of data streams comprise a network infrastructure data stream, a network information flow data stream, a network vulnerability scan data stream, a network intrusion detection alert data stream, a network mission dependencies data stream, an arbitrary data stream, or any combination thereof. In some embodiments, the plurality of data streams comprise a NetFlow data stream, a Nessus data stream, a Splunk alert data stream, or any combination thereof. In some embodiments, converting the received data to the common data format is performed independently of existing graph models stored within the graph database. In some embodiments, a node comprises information about a network device, a network computer, a network machine, a network cyberspace asset, a network domain, a network rule, a network mission objective, a network mission asset, a network mission task, a network alert, a network vulnerability state, a network vulnerability score, a cyberattack classification, an organization, a user, a geographical area, or any combination thereof. In some embodiments, the common data format for the node comprises a unique identifier (UID), a category description, a display name description, one or more key-value property fields, and an aggregation field. In some embodiments, the aggregation field comprises instructions for modifying the one or more key-value property fields of a corresponding node within the graph model when the node is integrated with the graph model. In some embodiments, an edge comprises information about a relationship between a starting node and a destination node. In some embodiments, the common format for an edge comprises a unique identifier (UID), a category description, a display name description, a starting node UID, a destination node UID, one or more key-value property fields, and an aggregation field. In some embodiments, updating the graph model comprises adding the node or edge of the converted data. In some embodiments, updating the graph model comprises deleting a node or edge of the plurality of nodes and edges stored within the graph model that corresponds to the node or edge of the converted data. In some embodiments, updating the graph model comprises modifying a property associated with a node or edge of the plurality of nodes and edges stored within the graph model according to that of the node or edge of the converted data. In some embodiments, the method further comprises sending an alert to the user of the graph database when the graph model has been updated.

Also disclosed herein are computing system for assessing a computer network using a graph database, comprising: one or more data input devices configured to receive data from a plurality of data streams; one or more processors; memory; and one or more programs stored in the memory that, when executed by the one or more processors, cause the one or more processors to perform a method comprising: receiving data from at least one the plurality of data streams, wherein the plurality of data streams comprise computer network data provided by one or more data brokers, and wherein the data received from different data streams of the plurality comprise a plurality of different data formats; converting the data received from the at least one data stream to a common data format comprising a node or an edge; updating a graph model comprising a plurality of nodes and edges stored within a graph database according to the stored node or edge of the converted data; and providing a user of the computer network with a visualization of a status of the computer network.

In some embodiments, the data received from the at least one data stream is received on an intermittent basis. In some embodiments, the data received from the at least one data stream comprises data indicating a present state of the computer network. In some embodiments, the plurality of data streams comprise a network infrastructure data stream, a network information flow data stream, a network vulnerability scan data stream, a network intrusion detection alert data stream, a network mission dependencies data stream, an arbitrary data stream, or any combination thereof. In some embodiments, converting the received data to the common data format is performed independently of existing graph models stored within the graph database. In some embodiments, the a node comprises information about a network device, a network computer, a network machine, a network cyberspace asset, a network domain, a network rule, a network mission objective, a network mission asset, a network mission task, a network alert, a network vulnerability state, a network vulnerability score, a cyberattack classification, an organization, a user, a geographical area, or any combination thereof. In some embodiments, an edge comprises information about a relationship between a starting node and a destination node. In some embodiments, updating the graph model comprises an action selected from the group consisting of adding the node or edge of the converted data, deleting a node or edge of the plurality of nodes and edges stored within the graph model that corresponds to the node or edge of the converted data, or modifying a property associated with a node or edge of the plurality of nodes and edges stored within the graph model according to that of the node or edge of the converted data. In some embodiments, the graph model comprises a plurality of layers, each layer associated with a type of computer-network information and comprising a subset of the plurality of nodes and edges in the graph model. In some embodiments, the method further comprises sending an alert to the user of the computer network when the graph model has been updated. In some embodiments, the method further comprises receiving a domain-specific data query from the user of the computer network. In some embodiments, the method further comprises converting the received domain-specific data query to a graph database native query that, when executed upon the graph database, returns matching subgraphs from the plurality of layers of the graph model. In some embodiments, the method further comprises providing the user of the computer network with a visualization of the returned matching subgraphs from across the layers of the graph model. In some embodiments, the method further comprises allowing the user of the computer network to select a graph dataset from a plurality of graph datasets associated with the graph database.

Disclosed herein are non-transitory computer readable storage media having stored thereon a set of instructions for assessing a computer network using a graph database that, when executed by a computing system, cause the computing system to: receive data from at least one of a plurality of data streams, wherein the plurality of data streams comprise computer network data provided by one or more data brokers, and wherein the data received from different data streams of the plurality comprise a plurality of different data formats; convert the data received from the at least one data stream to a common data format comprising a node or an edge; update a graph model comprising a plurality of nodes and edges stored within a graph database according to the node or edge of the converted data; and provide a user of the computer network with a visualization of a status of the computer network.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE FIGURES

Various aspects of the disclosed methods and systems are set forth with particularity in the appended claims. A better understanding of the features and advantages of the disclosed methods, devices, and systems will be obtained by reference to the following detailed description of illustrative embodiments and the accompanying drawings, of which:

FIG. 10A: no clustering.

FIG. 10B: mission nodes clustered. FIG. 10C: mission nodes and key terrain nodes clustered.

FIG. 17A: graph pattern for NetFlow data. FIG. 17B: graph pattern for Splunk alert data. FIG. 17C: graph pattern for Nessus vulnerability data.

DETAILED DESCRIPTION OF THE DISCLOSURE

Figure 1:
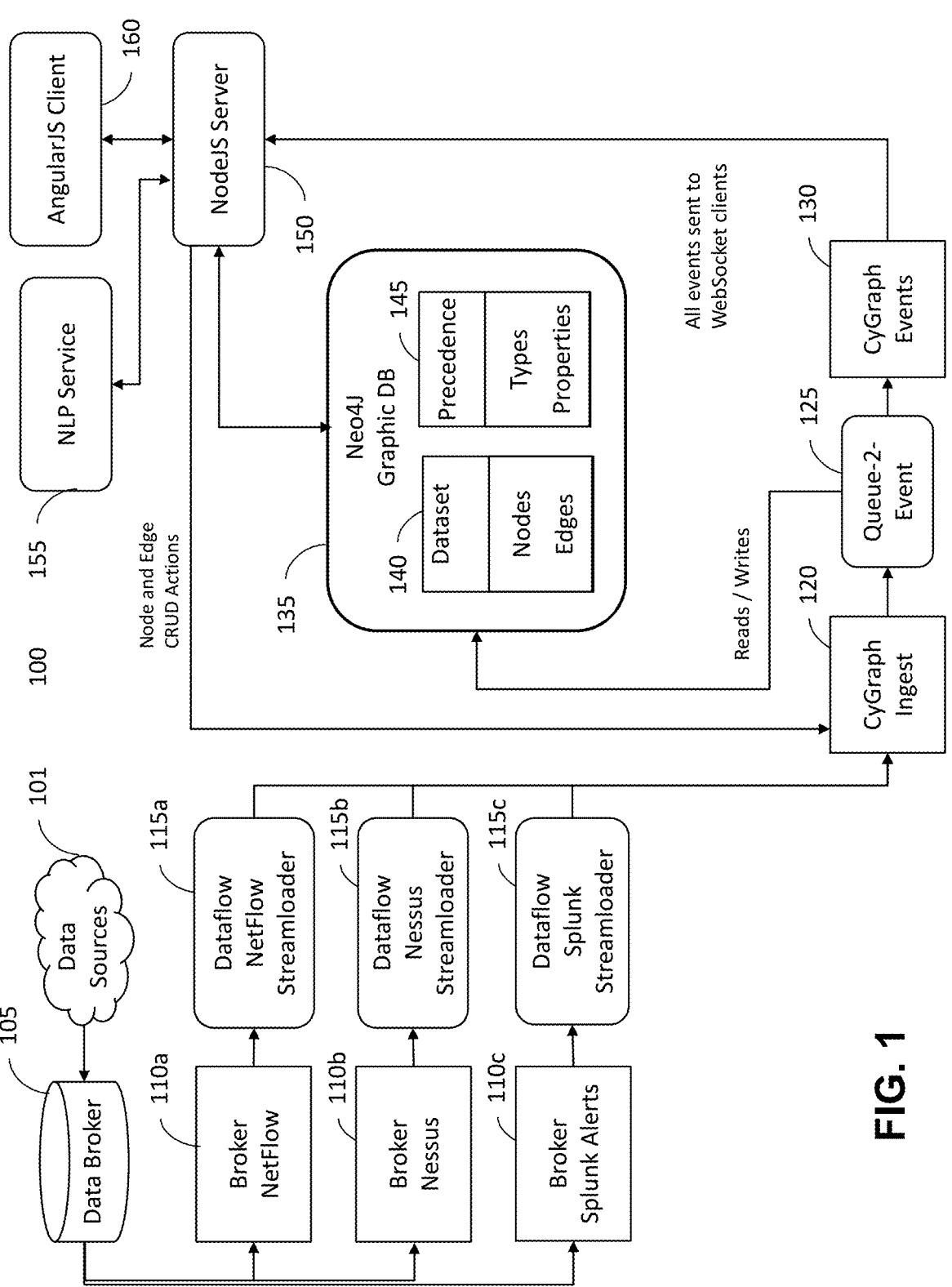
FIG. 1 illustrates an exemplary cybersecurity analysis system architecture according to examples of the present disclosure.

Disclosed herein are methods and systems for creating a data pipeline for efficient processing and ingestion of data received from a plurality of disparate data streams into a cyber-security analysis system that utilizes graph database techniques to model a computer network and visualize the impact of adversarial attacks on the computer network. Graph databases differ from traditional databases in that data is organized with a focus on the relationships between data points. As such, it can be challenging to incorporate data from disparate data sources, e.g., computer network status information provided by data brokers in the form of data streams comprising different types of information (e.g., network infrastructure data, network flow data, host alerts, mission critical dependencies, and the like). The different data streams provided by data brokers often have different data formats, and thus typically require complex and laborious source-specific data format conversion steps to be performed before the data may be ingested by the graph-based cyber-security analysis system. The disclosed methods and systems address these shortcomings.

Methods for assessing a computer network using a graph model are described that comprise: receiving data from at least one data stream of a plurality of data streams, where the plurality of data streams comprise computer network data provided by one or more data brokers, and where the data received from different data streams of the plurality comprise different data formats; converting the data received from the at least one data stream to a common data format comprising a node or an edge; storing the node or the edge within a graph database; updating a graph model comprising a plurality of nodes and edges according to the stored node or edge; and providing a user of the computer network with a visualization of a status of the computer network. A node may comprise information about, for example, entities or tasks. In some instances, for example, a node may comprise information about a network device, a network computer, a network machine, a network cyberspace asset, a network domain, a network rule, a network mission objective, a network mission asset, a network mission task, a network alert, a network vulnerability state, a network vulnerability score, a cyberattack classification, an organization, a user, a geographical area, or any combination thereof. An edge may comprise information about, for example, a relationship between a starting node and a destination node.

Computing systems for assessing a computer network using a graph database are described that comprise: one or more data input devices configured to receive data from a plurality of data streams; one or more processors; memory; and one or more programs stored in the memory that, when executed by the one or more processors, cause the one or more processors to perform a method comprising: receiving data from at least one the plurality of data streams, where the plurality of data streams comprise computer network data provided by one or more data brokers, and where the data received from different data streams of the plurality comprise a plurality of different data formats; converting the data received from the at least one data stream to a common data format comprising a node or an edge; storing the node or the edge within a graph database; updating a graph model comprising a plurality of nodes and edges according to the stored node or edge; and providing a user of the computer network with a visualization of a status of the computer network.

Also described are non-transitory computer readable storage media having stored thereon a set of instructions for assessing a computer network using a graph database that, when executed by a computing system, cause the computing system to: receive data from at least one of a plurality of data streams, where the plurality of data streams comprise computer network data provided by one or more data brokers, and where the data received from different data streams of the plurality comprise a plurality of different data formats; convert the data received from the at least one data stream to a common data format comprising a node or an edge; store the node or the edge within a graph database; update a graph model comprising a plurality of nodes and edges according to the stored node or edge; and provide a user of the computer network with a visualization of a status of the computer network.

The disclosed methods and systems enable a cybersecurity analysis system comprising a graph database to receive data (e.g., message data) from a plurality of data streams provided by one or more data brokers, where the data from different data streams may have the same or different data formats. The data from each message stream is converted on a per message basis into a common data ingestion (node/edge) format by a dedicated data streamloader (e.g., a data streamloader designed to recognize the data format for a given data stream) that is waiting to receive it, and is then output to a data ingest message stream within the cybersecurity analysis system. The initial conversion of incoming data stream messages by the data streamloaders is performed in a unified and source-independent manner without requiring that the existing data in the graph database be taken into account, thereby significantly reducing the complexity and time required for ingesting data from new data sources. Following the initial conversion of incoming data messages by the data streamloaders, messages from the data ingest message stream are processed by a software module that writes the converted (node/edge) message data to a graph database of the cybersecurity analysis system. The software module also passes the converted message data to an event message stream that sends the event message to a graph database server. The graph database server updates the graph model(s) within the graph database with the new node and/or edge information contained in the data ingest message. The graph database server also alerts users of the cybersecurity analysis system to the new event message so that they may submit queries regarding changes to the graph model(s) representing the computer network that may indicate, for example, a detection of an adversarial attack or a new network vulnerability.

The ability to easily aggregate data from a variety of network data sources enriches the overall data set available to the cybersecurity analysis system and enhances the ability of system users to analyze computer networks using graph database techniques. Furthermore, the near real-time performance achieved by processing incoming message data using dedicated data streamloaders allows the cybersecurity analysis system to update graph model(s) representing the computer network in near real-time, and thus enables security analysts and computer network operators to rapidly assess the consequences of adversarial attacks or network vulnerabilities and take appropriate action. The disclosed methods and systems optionally allow users of the cybersecurity analysis system to select a particular graph model dataset from among multiple graph model datasets present in secondary storage. The ability to incrementally enrich the selected graph model dataset provides flexibility in terms of matching the appropriate data to a given operational need. The disclosed methods and systems also enable the cyber-security analysis system to send asynchronous messages to external systems based on pre-defined data ingest conditions, thereby alerting system users to new incoming data and increasing the utility of the cyber network analysis tool within a system-of-systems environment.

Definitions: Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, unrecited additives, components, integers, elements or method steps.

The section headings used herein are for organizational purposes only, and are not to be construed as limiting the subject matter described.

Computer network sensors and network monitoring tools: In some instances, the disclosed methods and systems may receive data directly from a plurality of network sensors and/or network monitoring tools designed to provide real-time information about the state of a computer network. In some instances, network sensor data and/or network monitoring tool data may be sorted and compiled by a data broker, and provided to the disclosed cyber-security analysis systems in the form of, for example, topic data streams (or message streams). In some instances, the disclosed methods and systems may comprise receiving data from network sensors, network monitoring tools, data broker message streams (e.g., Apache Kafka message streams), or any combination thereof. In some instances, the data may be received intermittently, continuously, or asynchronously, e.g., as data messages or packets.

Examples of network sensors that may be used to provide information on the current state of a computer network include, but are not limited to, software-based network taps (e.g., use of monitoring software, remote management protocols (e.g., the simple network management protocol (SNMP)), port mirroring, or switch sniffer methods for collecting information about managed devices), hardware-based network taps (e.g., in-line sniffer devices), V-line tapping (or bypass tapping) methods, firewall logs, NetFlow collectors, and the like.

Examples of network monitoring tools that may be used to provide information on the current state of a computer network include, but are not limited to, the Cauldron (CyVision Technologies, Bethesda, MD) cyber situational awareness tool, the Common Attach Pattern Enumeration and Classification (CAPEC) (MITRE, McLean, VA) tool, the Cyber Analytics Repository (CAR) tool (MITRE, McLean, VA), the Collaborative Research Into Threats (CRITS) tool (MITRE, McLean, VA), the Crown Jewels Analysis (CJA) tool (MITRE, McLean, VA), the Cyber Command System (CyCS) tool (MITRE, McLean, VA), Intrusion Detection Software (IDS) from AT&T (AT&T Cybersecurity, Dallas, TX), the Nessus (Tenable, Inc., Columbia, MD) network vulnerability scanner, the NetFlow (Cisco Systems, Inc., San Jose, CA) network traffic monitoring tool for Cisco or other NetFlow-enabled routers, the Splunk (Splunk, In., San Francisco, CA) software tool for monitoring, searching, and analyzing machine-generated data in real time, the Threat Assessment and Remediation Analysis (TARA) tool (MITRE, McLean, VA) for identifying and assessing cyber vulnerabilities, the Wireshark (wireshark.org) tool for network troubleshooting, analysis, and monitoring of communications protocols, and the like.

Non-limiting examples of the types of data that can be provided by computer network sensors, network monitoring tools, and/or data brokers as input to the disclosed cyber-security analysis system include, but are not limited to, information relating to network components, network topology, network vulnerabilities, client/server configurations, firewall rules, network events, and mission dependencies. Cauldron, for example, may be configured to provide network topology information (e.g., subnetworks, routes, firewall locations), host enumeration data, host vulnerability data (based on vulnerability scans), and host firewall rules.

The Threat Assessment Remediation Analysis (TARA) tool may be configured to provide enumeration of cyber threats against particular network environments along with possible countermeasures. The Intrusion Detection Systems (IDS) software may be configured to provide detection of intrusion events for mapping to known vulnerability paths leading to mission-critical assets. The Cyber Analytics Repository (CAR) tool may be configured to represent the output of cyber analytics against host-based sensors focused on detecting adversary activities. As another example, network sensors may provide network packet capture data that provides information on general network packing flows. Network sensors may also provide hostflow data relating to the analysis of network packet flows from the perspective of host systems. The Collaborative Research Into Threats (CRITS) tool may be configured to provide an analysis of cyber threat intelligence. The Cyber Command System (CyCS) tool may be configured to provide data relating to dependencies among mission components (high-level to low-level) as well as mission dependencies, including mission dependencies on cyber assets. NetFlow may be configured to provide information on network traffic. Nessus may be configured to provide information on network vulnerabilities. The Splunk tool may be configured to issue alerts that are triggered when a specific search criterion is met for machine-generated data that is being monitored in real time. The various examples provided above are meant as examples only, and should not be construed as limiting in any way.

Data ingestion pipeline for a graph-based cybersecurity analysis system: FIG. 1 illustrates an exemplary cybersecurity analysis system architecture according to examples of the present disclosure. As illustrated in FIG. 1, the cybersecurity analysis system, 100, can be configured to receive data from a plurality of input data streams (or message streams), 110*a*, 110*b*, 110*c*, supplied by one or more data brokers, 105, where different data streams comprise different types of data that has been collected and aggregated from a variety of different data sources, 101, e.g., network sensors, network monitoring tools, and the like. As noted above, the input data streams may comprise data relating to network components, network topology, network vulnerabilities, client/server configurations, firewall rules, network events, mission dependencies, etc. In some instances, an input data stream may comprise an arbitrary data stream (e.g., comprising data from an arbitrary data source). In the non-limiting example illustrated in FIG. 1, the plurality of input data streams include a NetFlow data stream, 110*a*, a Nessus data stream, 110*b*, and a Splunk Alert data stream, 110*c*.

The input data streams, e.g., the NetFlow, 110*a*, Nessus, 110*b*, and Splunk Alert, 110*c*, data streams provided by data broker 105 in the example of FIG. 1, are monitored by data streamloaders, e.g., a dataflow NetFlow streamloader, 115*a*, a dataflow Nessus streamloader, 115*b*, and a dataflow Splunk streamloader, 115*c*, that are configured to monitor their respective data streams and receive incoming message data. Each streamloader is configured to receive message data of a specific type and format, convert the message to a common graph database ingestion format comprising a node or edge (as will be discussed in more detail below), and output the converted message to a message queue, e.g., the "CyGraph Ingest" message queue, 120, as illustrated in FIG. 1.

The converted messages placed in the "CyGraph Ingest" message queue, 120, are received by the "Queue-2-Event" software service module, 125, which writes the converted (node/edge) data to a graph database (e.g., a Neo4J graph database), 135, converts the message data to an event format (e.g., the "CyGraph Event" format), and outputs the event message to another message queue, e.g., the "CyGraph Events" message queue, 130, as illustrated in FIG. 1. Within the graph database, 135, the newly received node and/or edge data is written to dataset 140. The graph database, 135, also stores a precedence table, 145, which includes information about data type and data properties that is used to update a graph model derived from the data contained within graph database, 135, with the new node and/or edge data, as will be described in more detail below.

The event message added to the "CyGraph Events" message queue, 130, is received by a graph database server (e.g., a NodeJS server), 150, which serves as an interface between the graph database, 135, and users of the cybersecurity analysis system, e.g., users that access and query the graph model through a natural language processing (NLP) service, 155, or through an AngularJS interface, 160. In some instances, receipt of a new message on the "CyGraph Event" message queue, 130, by the graph database server, 150, may trigger an alert that is sent to users of the system.

Figure 2:
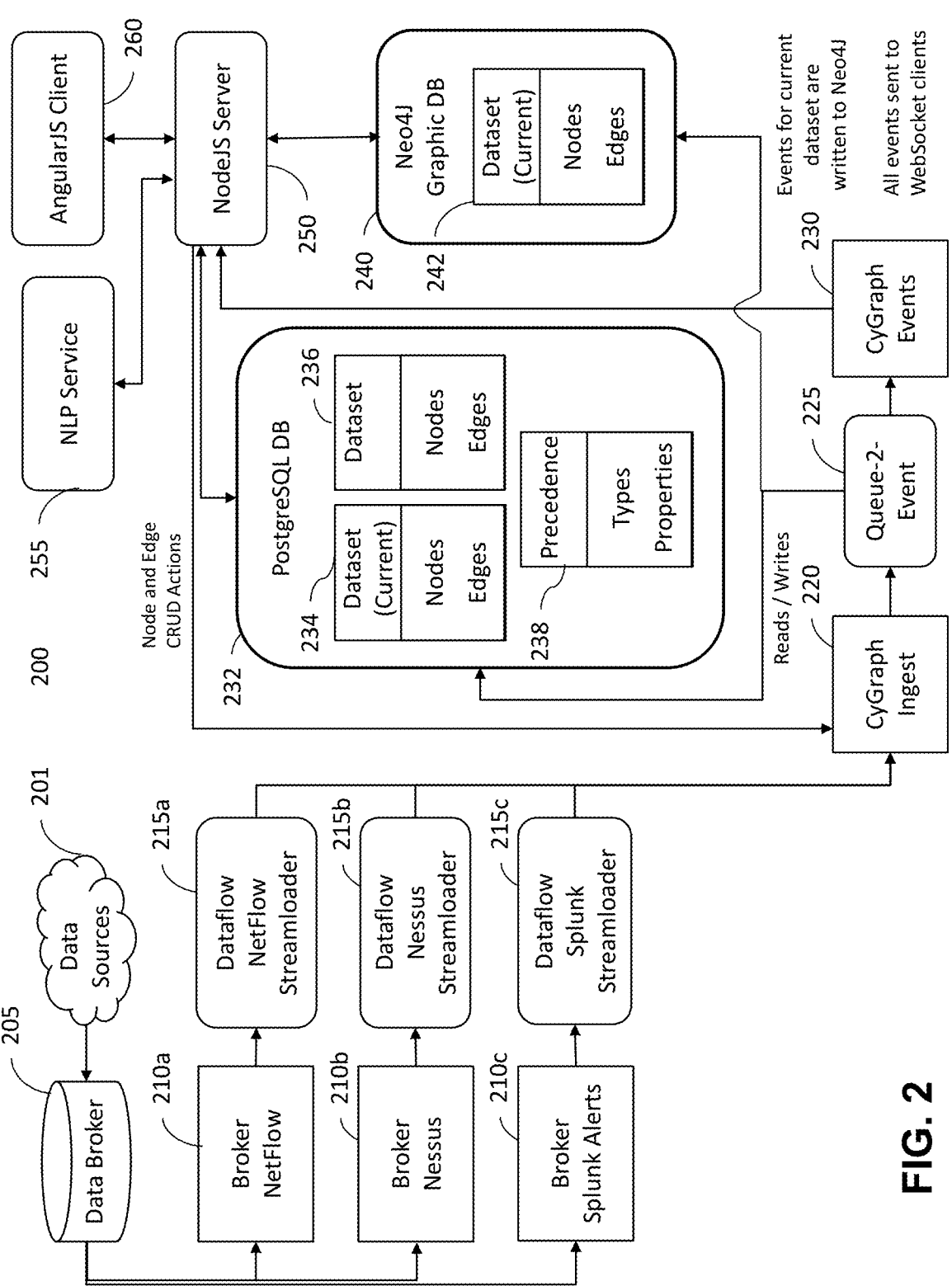
FIG. 2 illustrates another exemplary cybersecurity analysis system architecture according to examples of the present disclosure.

FIG. 2 illustrates a different configuration of a cybersecurity analysis system architecture according to examples of the present disclosure. As illustrated in FIG. 2, the cybersecurity analysis system, 200, can be configured to receive data from a plurality of input data streams (or message streams), 210*a*, 210*b*, 210*c*, supplied by one or more data brokers, 205, where different data streams comprise different types of data that has been collected and aggregated from a variety of different data sources, 201, e.g., network sensors, network monitoring tools, and the like. In the non-limiting example illustrated in FIG. 2, the plurality of input data streams again include a NetFlow data stream, 210*a*, a Nessus data stream, 210*b*, and a Splunk Alert data stream, 210*c*.

Again, the input data streams, e.g., the NetFlow, 210*a*, Nessus, 210*b*, and Splunk Alert, 210*c*, data streams provided by data broker 205 in the example of FIG. 2, are monitored by data streamloaders, e.g., a dataflow NetFlow streamloader, 215*a*, a dataflow Nessus streamloader, 215*b*, and a dataflow Splunk streamloader, 215*c*, that are configured to monitor their respective datastreams and receive incoming message data. Each streamloader is configured to receive message data of a specific type and format, convert the message to a common graph database ingestion format comprising a node or edge (as will be discussed in more detail below), and output the converted message to a message queue, e.g., the "CyGraph Ingest" message queue, 220, as illustrated in FIG. 2.

The converted messages placed in the "CyGraph Ingest" message queue, 220, are received by the "Queue-2-Event" module, 225, which writes the converted (node/edge) data to both a first graph database (e.g., a PostgreSQL database), 232, and a second graph database (e.g., a Neo4J graph database), 240, converts the message data to an event format (e.g., the "CyGraph Event" format), and outputs the event message to another message queue, e.g., the "CyGraph Events" message queue, 230, as illustrated in FIG. 2. Within the graph database, 232, the newly received node and/or edge data is written to dataset 234. The newly received node and/or edge data is also written to dataset 242 in graph database 240. Multiple datasets, 234 and 236, may be stored in the first graph database, 232, along with a precedence table, 238, which includes information about data type and data properties that is used to update graph models derived from the data contained within the graph databases, 232 and

240, with the new node and/or edge data. The capability for storing multiple datasets allows multiplexed updating and analysis of graph models derived from two or more datasets. In some instances, the first graph database, 232, may also store additional information, e.g., metadata associated with one or more datasets, that isn't stored within the second graph database, 240.

The event message added to the "CyGraph Events" message queue, 230, is received by a graph database server (e.g., a NodeJS server), 250, which serves as an interface between the graph databases, 232 and 240, and users of the cybersecurity analysis system, e.g., users that access and query the graph model through a natural language processing (NLP) service, 255, or through an AngularJS interface, 260. In some instances, receipt of a new message on the "CyGraph Event" message queue, 230, by the graph database server, 250, may trigger an alert that is sent to users of the system.

In some instances, the disclosed cybersecurity analysis systems may be configured to receive data from at least 1, at least 10, at least 20, at least 30, at least 40, at least 50, at least 60, at least 70, at least 80, at least 90, at least 100, at least 500, at least 1,000, or more than 1,000 network sensors, network monitoring tools, and/or other data sources.

In some instances, the disclosed cybersecurity analysis systems may be configured to receive data from at least 1, at least 2, at least 3, at least 4, at least 5, at least 6, at least 7, at least 8, at least 9, at least 10, or more than 10 different data broker message streams.

In some instances, the disclosed cybersecurity analysis systems may be configured to receive data from at least 1, at least 2, at least 3, at least 4, at least 5, at least 6, at least 7, at least 8, at least 9, at least 10, or more than 10 different data broker message streams (or topics), where each data broker message stream (or topic) is monitored by a dedicated data streamloader.

Figure 3:
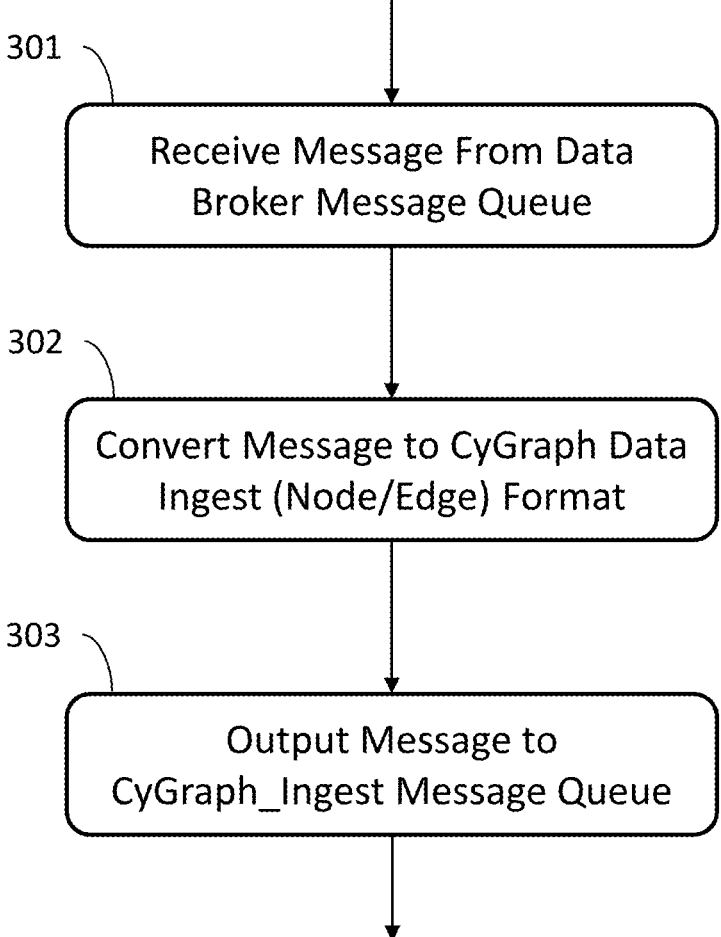
FIG. 3 shows a process for data ingestion performed by a data streamloader according to examples of the present disclosure.

FIG. 3 provides a schematic illustration of the process steps performed by each of the data streamloaders, 115a, 115b, or 115c, illustrated in FIG. 1. Each data streamloader is configured to monitor a given data stream and receive incoming message data of a specific type and format, 301. Upon receipt, the incoming message is converted to a common graph database ingestion format comprising a node or edge, 302, and then outputted to a data ingest message queue (e.g., the "CyGraph Ingest" message queue), 303.

Table 1 provides a non-limiting example of a data ingest format used by a graph model-based cybersecurity analysis system of the present disclosure. All incoming data is converted by dedicated data streamloaders on a message-by-message basis to the common format illustrated in the table. The reformatted ingest data may include, for example, a "unique identifier" (UID) field, "type" field, "showname" field, a "from" field (for edges only), a "to" field (for edges only), a "delete" field, a "properties" field, and an "aggregation" field. The conversion of incoming data from a plurality of disparate data sources to a common node/edge data ingest format allows the incoming data to be processed efficiently and coherently without prior knowledge of the existing data or graph models within the graph database

TABLE 1

CyGraph Ingest Format

```
CyGraph Ingest Format
. . .
{
   "uid": {
```

TABLE 1-continued

CyGraph Ingest Format

```
      "type": "string",
      "description": "Unique identifier"
   },
   "type": {
      "type": "string",
      "description": "Category of the node or edge"
   },
   "showname": {
      "type": "string",
          "description": "Display name"
   }
   "from": {
      "type": "string",
      "description": "UID of the starting node. ONLY FOR EDGES"
   },
   "to": {
      "type": "string",
      "description": "UID of the destination node. ONLY FOR EDGES"
   },
   "delete": {
      "type": "boolean",
      "description": "Flag to determine whether this is a delete event"
   },
   "properties": {
      "key": "value"
      "stream_type":"value", // e.g., "recast", "netflow"
      "alert_order":"value", // e.g., "1.5.1597260101.808497"
   }
   "aggregation": {
         "num_events": {
            "source": "value",
            "type": "value", // e.g., sum, count, or unique
            "remove_source": boolean,
            "stop": boolean
         }
   }
}
. . .
```

As indicated in Table 1, each node or edge may be assigned a unique identifier, a type (e.g., the type of node or edge), a display name (in the "showname" field) used in visualizing a graph model comprising the node or edge as displayed in a user interface, the unique identifiers for the starting node ("from" field) and destination node ("to" field) for an edge, and a "delete" value (a Boolean operator used when comparing the ingest data to existing data and updating a graph model in the graph database). Each node or edge may also be assigned one or more properties (e.g., one or more key-value pairs, each comprising a "key"—a constant that defines a data set—and a "value"—a variable that belongs to the data set). Examples of property key-value pairs include, but are not limited to, name-value, bytes-number of bytes, stream_type-value, alert_order-value, latitude-value, longitude-value, time-value, organization-value, etc. The property key-value pairs can include any property that can be associated with nodes or edges (relationships) in a graph database. Each node or edge is also assigned an "aggregation" field value comprising instructions on how to handle selected properties of the reformatted data when it is integrated with the existing node and edge data in the dataset stored within the graph database. For example, the "aggregation" field may comprise instructions to count or sum the values associated with a specific property "key" when incorporating new node or edge data into a dataset within the graph database (e.g., an existing node may have property "bytes"=5, and an incoming node may have property "bytes"=10; if the aggregation field includes instructions to sum byte values, the new node will have a property "bytes"=15).

Figure 4:
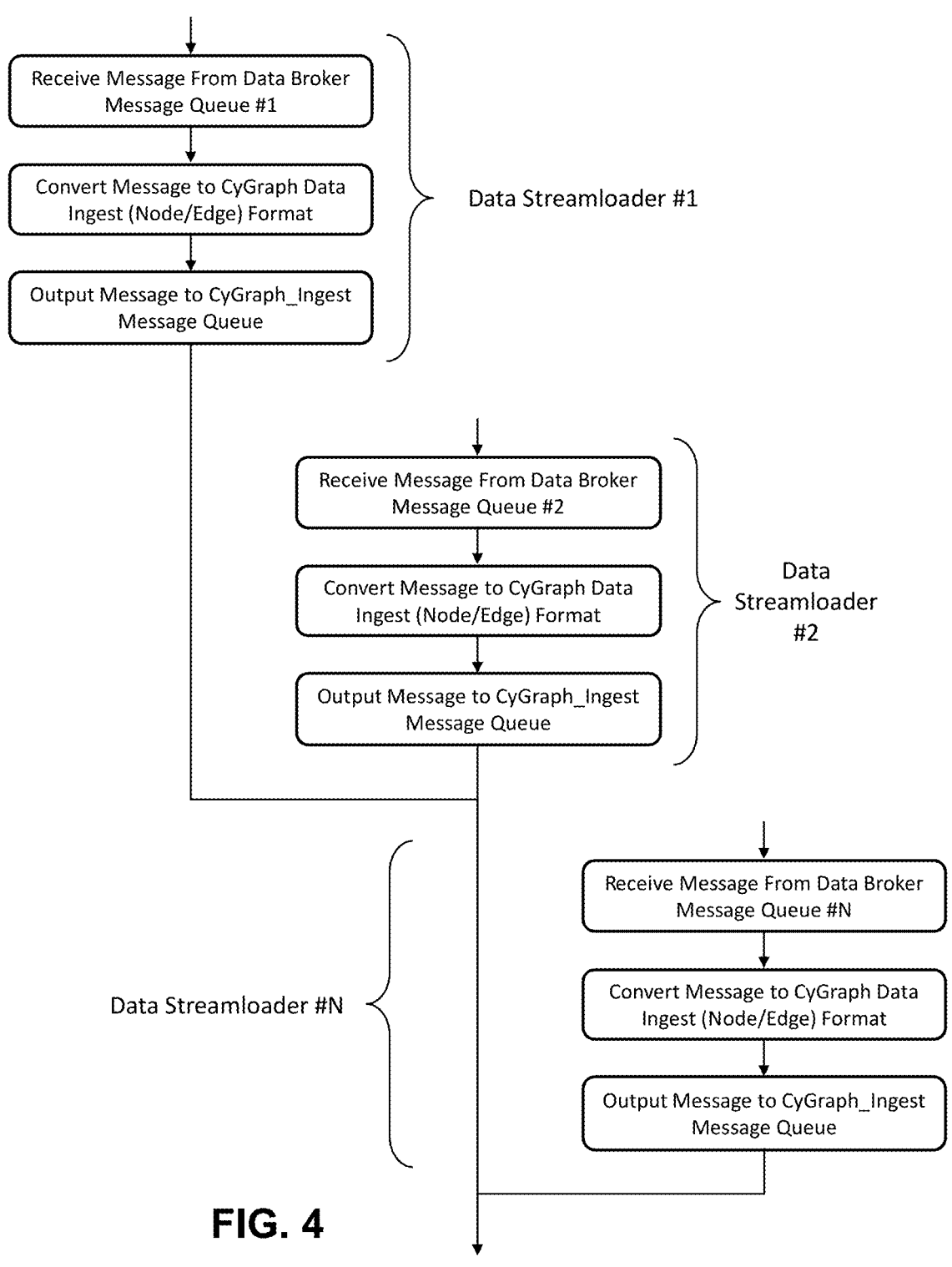
FIG. 4 shows a process for data ingestion performed by a plurality of data streamloaders according to examples of the present disclosure.

FIG. 4 provides a schematic illustration of a plurality of data streamloaders used to process and ingest data into a cybersecurity analysis system according to examples of the present disclosure. As noted each data source (e.g., a network sensor, network monitoring tool, a data broker topic or message stream, or any combination thereof) may have a dedicated data streamloader designed to convert incoming data to the common data ingest format on a message-by-message basis. For example, in FIG. 4, data streamloader #1 may be designed to convert messages received on data broker message queue #1 to the common data format and output the converted data to the CyGraph Ingest message queue; data streamloader #2 may be designed to convert messages received on data broker message queue #2 to the common data format and output the converted data to the CyGraph Ingest message queue, and the $N^{th}$ data streamloader may designed to do the same for messages received on data broker message queue #N. The use of dedicated streamloaders that convert incoming data to a common data ingest format facilitates the integration of new data sources and data streams into the cybersecurity analysis system.

Figure 5:
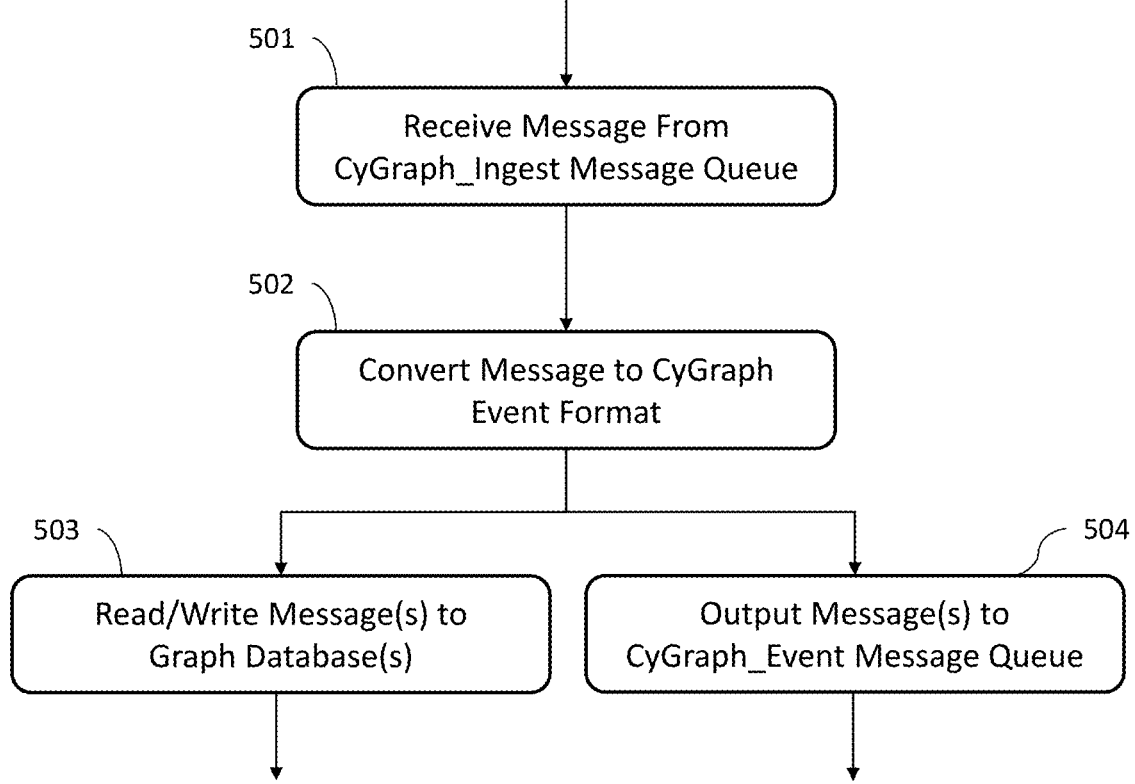
FIG. 5 shows a process for data ingestion performed by a queue-to-event module of a cybersecurity analysis system according to examples of the present disclosure.

FIG. 5 provides a schematic illustration of the process steps performed by the Queue-to-Event module, 125, of the cybersecurity analysis system illustrated in FIG. 1. The Queue-to-Event module 125 receives incoming messages on the data ingest message queue (e.g., the CyGraph_Ingest message queue, 120, illustrated in FIG. 1), 501, converts the message to an event message format (e.g., the CyGraph Event message format), 502, and also reads/writes data to the graph database(s), 503, while also outputting the event message to an event message queue (e.g., the CyGraph Event message queue), 504. The Queue-to-Event module maps the reformatted data to a property graph stored in a dataset within the graph database, and automatically infers the underlying graph model through inspection of the graph database.

For example, as each node and each edge is ingested by the Queue-to-Event module 125 it is compared (e.g., on the basis of unique identifier (UID), type, and/or properties) to the dataset within the graph database. For example, the unique identifier is used to determine if a corresponding node and/or edge already exists. If not, the new node and/or edge is added to the dataset. In the case of a NetFlow message having to do with network traffic, for example, typically two nodes and an edge are generated—a source "IP address" node, a destination "IP address" node, and an edge comprising data transfer information that connects them. In the case of a Nessus message having to do with computer vulnerability score). The Nessus message may comprise an edge to indicate that the specified vulnerability occurred on the specified computer. The Nessus message may also comprise an edge to indicate current status, so for example, if a specified vulnerability is fixed for a specified computer, the current vulnerability may be deleted but the information that there had been a vulnerability at one time would be retained.

In some cases, if a corresponding node and/or edge already exists within the dataset and the "delete" field is set to a value of "true" in the incoming formatted data, a node and/or edge may be deleted from the dataset.

In some cases, if a corresponding node and/or edge already exists within the dataset (and the "delete" field is set to "false"), the type for the new node or edge and the existing node or edge is checked. The graph database only allows one type per specified node or edge, so if the types differ, the system refers to a precedence table to determine which type is of higher priority and should be stored. Rather than adding a new node or edge, an existing node or edge may be modified depending on the type priority indicated by the precedence table. For example, a NetFlow message may comprise a type "IP address", and a Nessus message may be of type "computer". The relative importance of type "IP address" and type "computer" is determined by checking the precedence table. Typically, type "computer" would have higher precedence than type "IP address" so the modified node and/or edge may be assigned type "computer".

The graph database only allows one type per specified node or edge, so if the types differ, the system refers to a precedence table to determine which type is of higher priority and should be stored. Rather than adding a new node or edge, an existing node or edge may be modified depending on the type priority indicated by the precedence table.

Node and/or edge properties may also be compared and modified according to the relative importance assigned in a precedence table. The properties of the existing and incoming nodes and/or edges are compared and any properties that are different (i.e., if they don't exist in both) may be merged. For example, if an incoming node has property A and an existing node has property B, the modified node will have property A and property B. If both the incoming and existing nodes have the same property, A, but different values, the modified node will be assigned a property value according to the precedence table.

Table 2 provides a non-limiting example of a data type precedence table used during the mapping of incoming reformatted data to a dataset within the graph database.

TABLE 2

| Data Type Precedence Table |
| --- | database table to support type precedence
. . .
Table name: type_precedence
   type_name (varchar(20)) - type name, e.g., 'IPADDR', [Always uppercase] unique, primary key
     priority (int) - priority of name, unique
     type (varchar(20)) - node or edge
     description (varchar(100)) - description of item
     timestamp (TIMESTAMP) - date/time of last
. . .

vulnerabilities, typically two nodes would be generated—an "IP address" or "computer" node and a "vulnerability" node, which would be tied together later on. The Nessus message may also comprise a node for a vulnerability number (or Table 3 provides a non-limiting example of an event message format used by a graph model-based cybersecurity analysis system of the present disclosure. All incoming data ingest messages are converted by the Queue-to-Event module on a message-by-message basis to the event message format. The reformatted data may include, for example, an "event ID" field, an "event type" field, a "date" field, a "dataset ID" field, a "target" field, a "unique identifier" field, a "type" field, a "showname" field, a "to" field (for edges only), a "from" field (for edges only), and a "properties" field.

(comprising one node or one edge) may be assigned an event ID (e.g., an integer value identifying the event), an event type (e.g., an add, delete, or update action to be taken as a result of the event), a date, a dataset ID (e.g., an identification number for the dataset that the event should be applied to), a target (e.g., an indicator of whether the action should be applied to a node or an edge), a unique identifier (UID)

TABLE 3

CyGraph Event Format

```
CyGraph Event Format
. . .
{
  eventId: {
    type: Integer,
    description: "Integer identifying the event itself, not the node or edge UID"
  },
  eventType: { // add, delete, update
    type: String,
    description: "Action to take with this request, must be one of: ['add', 'delete', 'update']"
  },
  date: {
    type: Date-time stamp,
    description: "2020-04-13 13:52:03:1586785923"
  },
  datasetid: {
    type: Integer,
    description: "The ID for the Dataset this event should be applied to"
  },
  target: {
    type: String
    description: "String determining whether this is a 'node' or an 'edge'"
  },
  uid: {
    type: String,
    description: "The unique identified for the node or edge"
  },
  type: {
    type: String,
    description: "Label to use for the node or edge, should be all capitals"
  },
  showname: {
    type: String,
    description: "The name to show on the UI for the node or edge"
  },
  to: {
    type: String,
    description: "The UID for the node where this edge begins. Only present for edges."
  },
  from: {
    type: String,
    description: "The UID for the node where this edge ends. Only present for edges."
  },
  properties: {
    type: JSON,
    description: "Key value pairs for the properties of the node or edge."
    example:
      {
        "foo": "bar",
        "baz": "wombat"
      }
  }
}
. . .
```

The source data (a NetFlow message, for example) is split by the corresponding streamloader into separate node or edge events. In the case of a NetFlow message, for example, the streamloader typically splits the original message into 2 nodes and an edge, each of which constitutes a separate message in the CyGraph Ingest format. Each event is handled one at a time by Queue-2-Event, which merges the single node or edge with the existing data in the CyGraph dataset and publishing a single event to the Cygraph_Events topic in the CyGraph Event format that covers how the data merge was performed. As indicated in Table 3, each event (e.g., the unique identifier for the node or the edge), a type (e.g., a label to be used for the node or edge), a display name (in the "showname" field) used in visualizing a graph model comprising the node or edge as displayed in a user interface, the unique identifiers for the starting node ("from" field) and destination node ("to" field) for an edge, and a properties field (e.g., one or more key-value pairs, as described above).

The data output by the Queue-to-Event module is in the event data format (e.g., the CyGraph Event format). The unique identifier for the event should be the same as the unique identifier of the ingested node and/or edge. The "target" field indicates whether the event is a node or an edge. Event type determines if the action performed by the event is going to be an addition, a deletion, or an update to the dataset. For example, if the ingest data format was of type "delete"="true", then the event generated by Queue-to-Event will be "event type"="delete". Alternatively, if ingest data was of type "delete"="false", and there is no existing node in the dataset that has the same unique identifier, the event generated by Queue-to-Event will be "event type"="add".

In the case of, for example, a node for which there is no corresponding node with the same UID in the dataset, the node will be added without having any relationships (edges) connecting it to other nodes, i.e., it will be added as an orphan node in the system. NetFlow messages are an example of where this can happen. For a NetFlow message, Queue-to-Event adds a first node, a second node, and then an edge that connects them. For some short period of time, e.g., several milliseconds, two orphan nodes that aren't connected will reside in the dataset.

As noted above, the "aggregation" field of the incoming ingest data may comprise instructions to count or sum the values associated with a specific property "key" when incorporating the new node or edge data into the dataset within the graph database. The Queue-to-Event module will then update the dataset accordingly (e.g., an existing node may have property "bytes"=5, and an incoming node may have property "bytes"=10; if the aggregation field includes instructions to sum byte values, the new node will have a property "bytes"=15).

Figure 6:
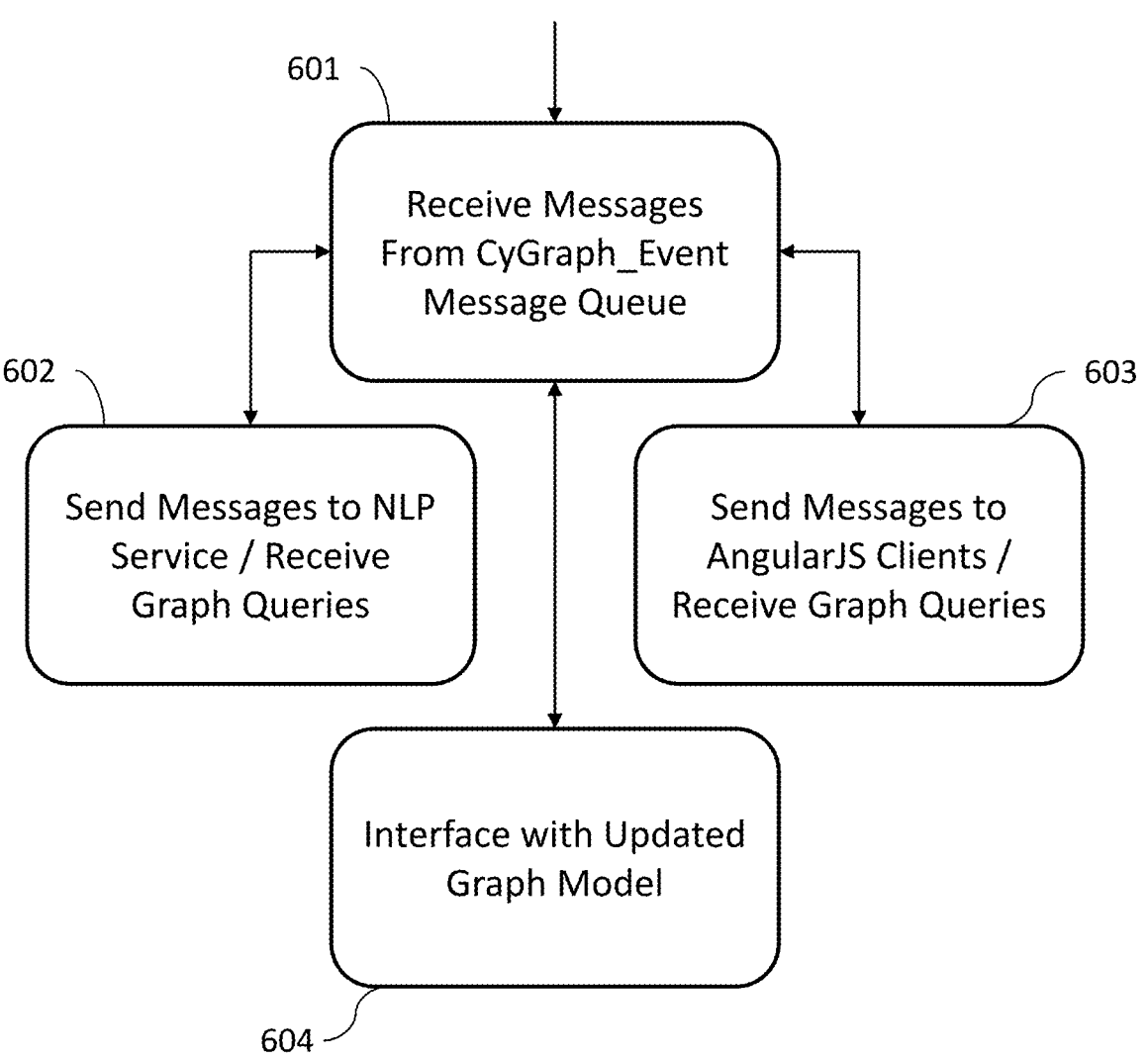
FIG. 6 provides a schematic illustration of the processes performed by a graph database server (e.g., a NodeJS server) of a cybersecurity analysis system according to examples of the present disclosure.

FIG. 6 provides a schematic illustration of the processes performed by the graph database server, 150, as illustrated in FIG. 1. The graph database server receives event messages from the event message queue (e.g., the CyGraph Event message queue), 601, communicates the receipt of a new event with users of the cybersecurity analysis system and accepts new user queries regarding the updated graph model, e.g., through a natural language processing (NLP) interface, 602, or an AngularJS client interface, 603, and interfaces with the updated graph model(s) in the graph database(s), 604. After the ingested data has been mapped to a property graph stored in a graph database, the underlying graph model is automatically inferred through inspection of the graph database. The model may then be presented to the user in the browser user interface as an interactive graph visualization.

Table 4 provides a non-limiting example of a graph database dataset format as used by a graph model-based cybersecurity analysis system of the present disclosure. After updating according to the incoming event data, the node and edge data residing in the one or more datasets within the graph database has the format illustrated in the table. The graph database data may include, for example, a "name" field, a "description" field, a "stored queries" field, a plurality of nodes (each comprising a "unique identifier" field, a "type" field, a "showname" field, and a "properties" field), and a plurality of edges (each comprising a "type" field, a "showname" field, a "from" field, a "to" field, and a "properties" field).

TABLE 4

CyGraph Dataset Format

```
CyGraph Dataset Format
. . .
{
  name: {
    type: String,
    description: "Name for this dataset"
  },
  description: {
    type: String,
    description: "Description of this dataset"
  },
  storedQueries: [
    {
      query: {
        type: String
        description: "Specification of this graph database query"
      },
      name: {
        type: String,
        description: "Name for this query"
      },
      description: {
        type: String,
        description: "Description of this query"
      },
      lang: {
        type: String,
        description: "Language in which this query is written"
      }
    }
  ],
  nodes: [
    {
      properties: {
        type: Object,
        description: "Key-value pairs for the various properties, for example {foo:'bar'}"
      },
      type: {
```

TABLE 4-continued

CyGraph Dataset Format

```
        type: String,
        description: "Type of this node. By convention, snake case with first letter of each word
capitalized"
      },
      showname: {
        type: String,
        description: "Name that will be displayed for this node in graph visualizations"
      },
      uid: {
        type: String,
        description: "Unique identifier for this node"
      }
    }
  },
  edges: [
    {
      type: {
        type: String,
        description: "Type of this edge. By convention, snake case with all capital letters"
      },
      from: {
        type: String,
        description: "Unique identifier (uid) for the node from which this edge is directed"
      },
      to: {
        type: String,
        description: "Unique identifier (uid) for the node to which this edge is directed"
      },
      showname: {
        type: String,
        description: "Name that will appear on the displayed edge (if enabled)"
      },
      properties: {
        type: Object,
        description: "Key-value pairs for the various properties, for example {foo:'bar'}"
      },
    }
  ]
}
. . .
```

As indicated in Table 4, the data stored in a dataset within the graph database may include, for example, a name for the dataset; a description of the dataset; a set of stored graph database queries (e.g., a list of queries that a user has saved so that they can repeat them at a later time), each comprising a specification for a graph database query, a name for the graph database query; a description of the query, and the language in which the query was written; the unique identifiers (UIDs), types, display names, and properties for a plurality of nodes; and the types, unique identifiers (UIDs) for starting and destination nodes, display names, and properties for a plurality of edges.

In some instances, a data set stored within a graph database of the disclosed cybersecurity analysis systems may include formatted data for hundreds, thousands, or tens of thousands of nodes and/or edges. In some instances a dataset may include formatted data for at least 100, at least 1,000, at least 10,000, at least 25,000, at least 50,000, at least 75,000, or at least 100,000 nodes and/or edges.

In some instances, a graph database used in the disclosed cybersecurity analysis systems may include 1, 2, 3, 4, 5, 6, 7, 8, 9, 10, 15, 20, 30, 40, 50, or more than 50 stored data sets.

In some instances, the novel data ingestion methods disclosed herein allow a graph database and graph models residing therein to be updated in near real-time. In some instances, for example, the latency for receiving data from a data source (e.g., a data broker message stream), converting the data to the ingestion format, generating an event based on the converted data, and updating the graph database (and graph models residing therein) may be less than 30 second, less than 20 seconds, less than 10 seconds, less than 9 seconds, less than 8 seconds, less than 7 seconds, less than 6 seconds, less than 5 seconds, less than 4 seconds, less than 3 seconds, less than 2 seconds, or less than 1 second. An example of data processing latency time for one non-limiting implementation of the disclosed cybersecurity analysis systems is described below in Example 2.

Cyber-security analysis systems: As noted above, the disclosed cybersecurity analysis systems enable security analysts to visualize the status of a complex computer network and rapidly assess the potential impact of network vulnerabilities and adversarial attacks on the mission critical functions and capabilities of the network. The novel data ingestion methods disclosed herein allow security analysts to monitor and visualize the status of a complex computer network in near real-time.

Upon receipt of an event alert (e.g., a message on the Cyber Events message stream, 130, as illustrated in FIG. 1), users of the system may query the system for updates regarding, for example, network vulnerabilities, network events, and/or changes to mission-critical dependencies. Users may query the system through any of a variety of interfaces, for example, through a natural language processing (NPL) interface (155, as illustrated in FIG. 1), an AngularJS client interface (160, as illustrated in FIG. 1), or a WebSocket application programming interface.

Table 5 provides non-limiting examples of data format conversions used as part of the query process in exchanging data between the user interface, the graph database server (e.g., a Neo4J server, 135, as illustrated in FIG. 1), the web server (e.g., the NodeJS server, 150, as illustrated in FIG. 1), the graph database, and other front-end libraries (e.g., a VisJS library).

cybersecurity graph model. The disclosed methods and systems employ a schema-free design with a property-graph data model. The specific network security data model is defined implicitly, according to how source data are transformed to a property graph. To help security analysts work more easily with such complex models, the system automatically infers the underlying data model for a populated

TABLE 5

Front-End Data Conversion Formats

Data Format Conversions between CyGraph Format, Neo4J, and VisJS (Front-end library)

| Node/Edge | CyGraph | Neo4J | VisJS |
| ------ | ------ | ------ | ------ |
| Node | showname | name | label |
| Node | type | label | group |
| Node | uid | properties.uid | properties.uid |
| Node | properties <br>*JSON {foo: 'bar'}* | properties <br>*JSON {name: value}* | properties <br>*JSON {name: value}* |
| Node | - | id | id |
| Node | - | - | Title ("Node Type: *label*") |
| - | - | - | - |
| Edge | to | startNode | to |
| Edge | from | endNode | from |
| Edge | type | type | name |
| Edge | properties <br>*JSON {foo: 'bar'}* | properties (JSON {name: value} | properties (JSON {name: value} |
| Edge | - | id | id |
| Edge | - | - | title ("Edge Type: *name*") |

Graph model-based cybersecurity analysis systems: The disclosed cybersecurity analysis systems capture the complex relationships among the different cyberspace components of a computer network, along with mission-critical dependencies of the network on those components. Pattern-matching queries by security analysts are used to interrogate the graph of network relationships according to user-specified constraints, and identify focused clusters of, for example, high-risk activity from the swarm of complex network relationships. User queries can be expressed in a domain-specific language (e.g., the CyGraph Query Language (CyQL)) for interrogating graph patterns of interest, which the cybersecurity analysis system (e.g., CyGraph) translates into a backend native query language. The cybersecurity analysis system automatically infers the structure of the underlying graph model through analysis of the ingested data, which it presents to the user for generating queries in an intuitive way.

The disclosed cybersecurity analysis systems build information-rich graph models from various network and host data sources, thereby fusing isolated data and events into a unified model of a computer network. Using this graph model, security analysis and computer network operators can apply powerful graph queries that are able to identify, for example, multistep threat pathways for accessing key cyber assets, as well as other patterns of cyber risk. The tool correlates and prioritizes alerts in the context of network vulnerabilities and key network assets.

Traditional graph formulations comprise entities (nodes) and relationships (edges) of a single homogeneous type, and lack the expressiveness required for representing the rich relationship structures involved in analyzing cyber risk. The disclosed cybersecurity analysis systems employ property graphs, i.e., attributed, multi-relational graphs with nodes and edges that may have arbitrary properties. Property graphs have the ability to express and visualize a range of heterogeneous node and edge types which arise from combining data from a variety of sources into a coherent unified graph. It's domain-specific query language provides a simplifying layer of abstraction from the native query language of the graph database implementation.

Non-limiting examples of the architecture for the disclosed cybersecurity analysis systems are shown in FIG. 1 and FIG. 2, as described above. The formal structures that form the basis of a graph model, $G=(N, E)$, is a pair of sets of nodes and edges. The edges are, themselves, relationships between ordered pairs of nodes $(n_1, n_2)$ from N. A property graph is a graph in which the nodes and edges have associated attributes, that is, arbitrary key/value pairs describing properties of the component nodes or edges. For example, nodes have attributes that include a unique identifier and a type, as described above. Edges also have an attribute describing their type as well as additional attributes identifying their source and destination nodes, as described above. Additional attributes may include such things as location information, mission criticality, or traffic packet counts.

A graph model instance is defined by the properties attributed to the nodes and edges, as well as any constraints that may be in effect. Property graphs conforming to a graph model instance are progressively built from heterogeneous data sources with records containing information about the nodes and edges. The disclosed methods allow the system to receive data from a variety of disparate data sources, and apply data transformations that map elements of the source data to nodes, edges, and their associated properties. Thus, these data transformations implicitly define an instantiated graph model.

To better understand how a property graph is built, consider the process of reading in a record r from a data source. Assume that the existing graph is $G=(N, E)$, and the transform T extracts information about two nodes, $n_1$ and $n_2$, and an edge e between them. The new graph is $G'=(N \cup \{n_1, n_2\}, E \cup \{e\})$, where the properties of $n_1$, $n_2$, and e are defined by the transform T. If $n_1$ or $n_2$ was already in N then their properties are simply updated according to any extra information contained in record r.

In general, any property (of nodes or edges) that has potential analytical value for constraining graph queries can be included as a node or edge property. The type for a node or edge can then be defined as an arbitrary function of its properties. Thus, the node and edge types depend on the source data, via the transformation to a property graph residing within the graph database.

The disclosed cybersecurity analysis systems ingest data from a plurality of disparate data sources according to the methods described herein and normalizes them. It then transforms the elements of the normalized model into a graph model specific to a cybersecurity domain. The graph model is defined by how the data sources are transformed into a property graph, rather than conforming to a predetermined schema. Graph model extensions are simply the creation of additional nodes, relationships, and properties in the property graph model.

Figure 7:
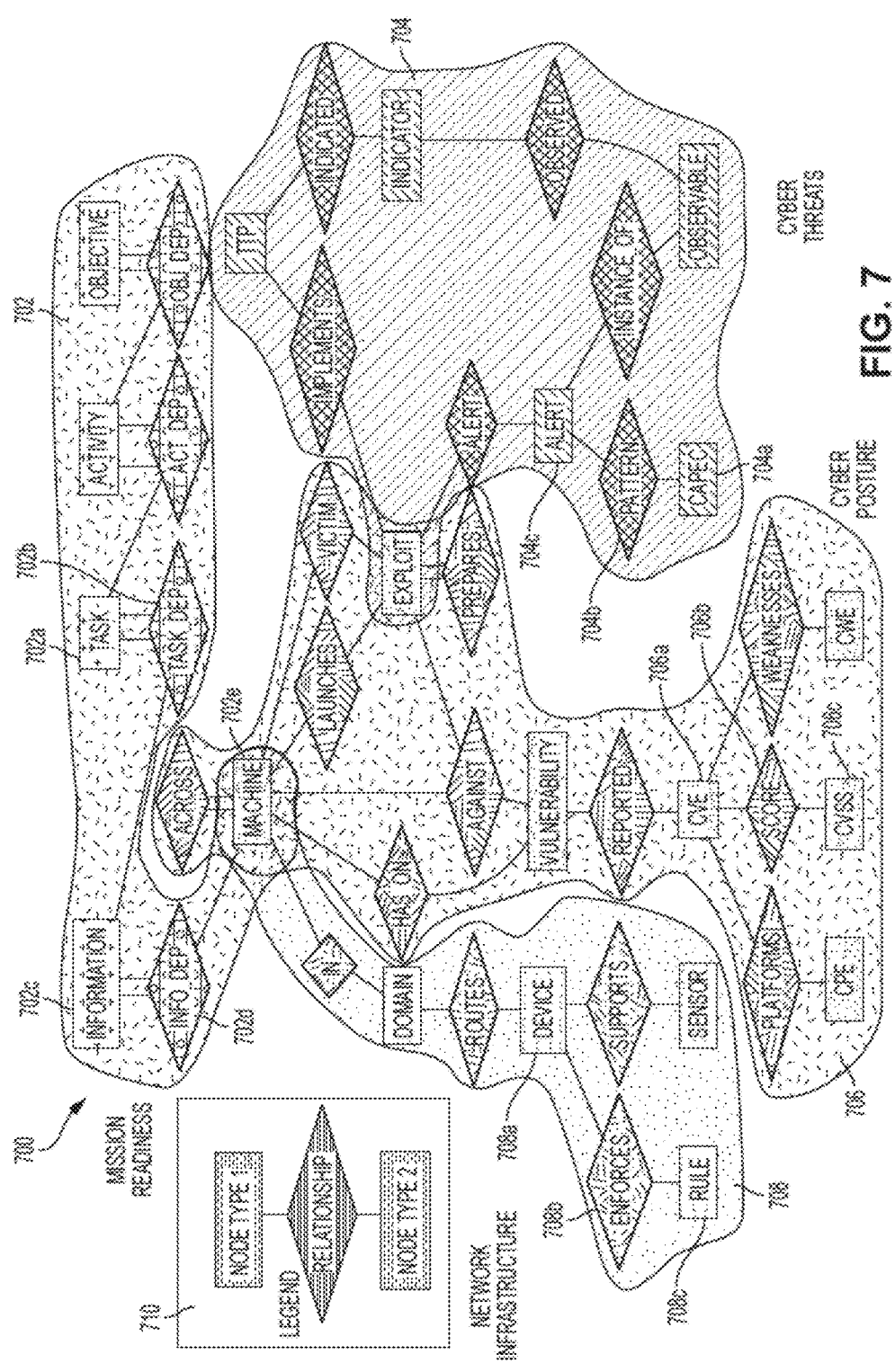
FIG. 7 illustrates an exemplary layered graph model generated by a cybersecurity analysis system according to examples of the present disclosure.

FIG. 7 illustrates an exemplary layered graph model generated by a cybersecurity analysis system according to examples of the present disclosure. In some instances, the graph model may comprise a plurality of layers (e.g., 2, 3, 4, 5, 6, 7, 8, 9, 10, or more than 10 layers), wherein each layer of the graph model is associated with a specific type of computer-network information and comprises a subset of the plurality of nodes and edges in the graph model. The graph model 700 can include, for example, four separate layers: a mission readiness layer 702, a cyber threats layer 704, a cyber posture layer 706, and a network infrastructure layer 708. The mission readiness layer 702 can include nodes and edges that illustrate how cyber activities can relate to mission elements. The cyber threats layer 704 can include events and indicators of actual cyber-attacks, which can be correlated with elements of the network infrastructure. The cyber posture layer 706 can represent the security posture of the network and the network's preparedness against cyber-attacks. The network infrastructure layer 708 can capture the configuration and policy aspects of the network environment, which can form the basis for modeling security posture (potential vulnerability paths).

The mission dependencies layer 702, in one example, can be populated with data obtained from a process for identifying those cyber assets that are most critical of an organization's mission. This type of analysis can identify the cyber assets most critical to mission accomplishment for assessing against those assets. In addition, the analysis can select mitigation measures to prevent and/or fight through various attacks. The data for such an analysis can be "ingested" into the graph database via a plurality of data streamloaders, as described above. The reformatted data output by the data streamloaders can form nodes and edges of a graph model.

Returning to FIG. 7, the mission readiness graph model 702 can include, as an example, a node 702a that identifies a task associated with a mission objective. The mission dependency graph model can also include a node 702c that identifies an information asset. The mission readiness graph model 702 can also include an edge 702b that identifies and contains information relating to the relationship between the task node 702a and the information node 702c. The mission readiness graph model 702 can also include a cyber asset node 702e that contains information on a cyber asset that supports the information asset of 702c. A graph edge 702d can contain information on the dependency between machine node 702e and information node 702c.

The cyber threats graph model layer 704, in one example, can be populated by nodes and edges that are based on data obtained from analysis tools such as Splunk that can capture, index, and correlate real-time data of the operational environment of a network for the purpose of identifying data patterns commensurate with a cyber-attack or network vulnerability. Additionally, the cyber threats graph model layer 704 can be populated with nodes and edges that are based on data obtained from databases that contain catalogs and taxonomy of attack patterns, such as MITRE's Common Attack Pattern Enumeration and Classification (CAPEC™). Such a database or catalog can provide a standardized catalog and taxonomy of attack patterns and can organize patterns into a taxonomic hierarchy (general attack classes, their sub-classes, and specific attacks).

As examples of nodes and edges within the cyber threats layer 704, the graph model 700 can include a classification/taxonomy node 704a. Classification/taxonomy node 204a can include information about a particular known cyber-attack and its classification/taxonomy according to sources such as CAPEC discussed above. The cyber threats layer 704 can also include an alert node 704c. Alert node 704c can include information gathered in real-time about the state of a network, such as the type of data gathered by Splunk discussed above. Using Splunk as an example, when Splunk identifies a suspicious pattern of behavior within a network, it can generate an alert that can be represented by an alert node 704c. The pattern of behavior that generated alert 704c can be represented by an edge 704c of the graph model 700 that can contain information related to the pattern that would trigger an alert 704c. The edge 704c can connect nodes 704a and 704c such that the relationship between a particular alert as discovered by data sources such as Splunk can be related back to known cyber-threats as detailed in a classification of cyber-threats, such as CAPEC.

The cyber posture layer 706 can include nodes and edges associated with potential exploitable vulnerabilities within a network infrastructure. As an example, the nodes and edges associated with the cyber posture layer 706 can be populated with data from the Common Vulnerabilities and Exposure (CVE) platform that provides a dictionary of common names for publicly known cybersecurity vulnerabilities and can evaluate network infrastructure to determine the exposure of the network to such vulnerabilities. In addition, the nodes and edges associated with the cyber posture layer 706 can be populated with data from the Common Vulnerability Scoring System (CVSS) platform. CVSS is a standard for assessing the severity of computer system security vulnerabilities. CVSS can attempt to assign severity scores to vulnerabilities, allowing network managers to prioritize responses and resources according to the threat.

In the example of FIG. 7, cyber posture layer 706 can include a CVE node 706a that can relate to a vulnerability of the network and a CVSS node 706c that pertains to a scoring of such vulnerability. The nodes 706a and 706c can be related using the graph edge 706b that can contain information pertaining to the score of the CVE vulnerability node 706a using the CVSS scoring model as represented by node 706c.

As discussed above, the graph model 700 can include a network infrastructure layer 708. The network infrastructure layer 708 can include information that captures the configuration and policy aspects of the network environment, which can form the basis for modeling security posture (i.e., potential vulnerability paths). As an example, the graph model 700 can leverage known tools such as Cauldron that can aid in visualizing potential attacks against an enterprise by building a network model using results from vulnerability scanners, asset management, firewall rules, and other network data sets. As an example, the network infrastructure layer 708 can include a device node 708*a* that, in one example, can represent a firewall within an enterprise network. The network infrastructure layer 708 can also include a rules node 708*c* that can represent a set of rules of network behavior, such as which types of data packets to filter or which network traffic to block. The relationship between nodes 708*a* and 708*c* can be represented by edge 708*b*, which can represent the fact that the firewall device represented by device node 708*a* enforces the rules represented by node 708*c*.

Once the graph model 700 has been constructed using data ingested from a plurality of data sources (e.g., a plurality of data broker topics 110*a*, 110*b*, 110*c*, as illustrated in FIG. 1), the graph model 700 can be queried by a user of the cybersecurity analysis system. Graph queries are issued from the client front end (e.g., translated from a domain-specific query language to a native query language through a middle-tier service) and then executed on the backend graph database. The resulting query matches are then visualized in the client web browser.

Generally, a commercial-off-the-shelf graph database technology, such as Neo4J, will have a query language associated with it. In some instances, the query language associated with commercial graph database technologies may be overly verbose, since the language is typically domain agnostic and applicable to any scenario in which a graph database is to be employed. Thus, in some instances, a domain-specific query language may be helpful in creating a user-friendly syntax that allows a user to query the graph database explained with respect to FIG. 7.

The domain specific language can have cyber semantics encoded within it, thereby encapsulating and hiding many of the constraints that would have to be expressed in a native graph database query. The domain-specific language can reduce the learning curve and increase the productivity of the security analysts and content developers using the cybersecurity analysis system.

The domain-specific query language can include grammar that facilitates user-friendly use of the query capabilities of the graph system. As examples, the domain-specific language can include primitives relating to entity (node) types such as machines, exploits, alerts, indicators, and vulnerabilities. The domain-specific language can include properties such as IP address, MAC addresses, Hostname, Operating system, and Applications. The domain specific language can include relationship (edge) types, such as "against" (exploit against vulnerability), "on" (vulnerability on machine), and "enables" (machine enables exploit).

An important aspect of graph structure pertains to reachability. The domain-specific language (e.g., CyQL) may allow for the specification of structural features of trajectories through a graph. When a query Q is applied to a graph G it results in a (possibly empty) subgraph G'⊆G. This matching subgraph is then displayed in the user interface. A directed trajectory is an alternating sequence of nodes and edges $(n_0, e_1, \ldots, e_k, n_k)$ in which, for every 0<i≤k, the source of $e_i$ is $n_{i-1}$ and the destination is $n_i$. An undirected trajectory is similar, except for any edge $e_i$, its source and destination may be $n_i$ and $n_{i-1}$ respectively. The length of a trajectory is the number of edges. The graph of a trajectory is $(\{n_0, \ldots, n_k\}, \{e_1, \ldots, e_k\})$ in which the sequence information has been forgotten. A trajectory t is a trajectory of graph G=(N, E), if the trajectory's graph (N', E') is a subgraph of G (i.e., N'⊆N and E'⊆E).

The domain-specific language (e.g., CyQL) may specify trajectories by constraining the number of hops, and the types of the initial node, the end node, and the edges. Queries can be built from, for example, the following clauses with their associated semantics:

hops($numHops): a trajectory satisfies this clause if its length is $numHops hops($minHops,$maxHops): a trajectory satisfies this clause if its length is between $minHops and $maxHops (inclusive)

startType($type): trajectory $(n_0, e_1, \ldots, n_k)$ satisfies this clause if $n_0$ is of type $type endType($type): trajectory $(n_0, e_1, \ldots, n_k)$ satisfies this clause if $n_k$ is of type $type startId($id): trajectory $(n_0, e_1, \ldots, n_k)$ satisfies this clause if the unique node identifier $u(n_0)$ of node $n_0$ is equivalent to $id endId($id): trajectory $(n_0, e_1, \ldots, n_k)$ satisfies this clause if the unique node identifier $u(n_k)$ of node $n_k$ is equivalent to $id edgeTypes($types): a trajectory satisfies this clause if each edge is of one of the types in the comma separated list $types undirected( ): by default, satisfying trajectories must be directed; when this clause is used, undirected trajectories also satisfy the query A CyQL clause is a concatenated sequence of such clauses. A trajectory t satisfies a CyQL query Q (written t|=Q) if it satisfies all of the clauses. The result of applying Q to graph G is simply the union of all trajectories of G that satisfy Q. That is:

$$Q(G)=\{t\in \text{trajectories of } G: t|=Q\}.$$

CyQL also includes other features for matching patterns in the cybersecurity domain, including keywords for host names, IP addresses, and subnet address ranges, arbitrary Boolean combinations of clauses, and wildcards in parameter values. CyGraph queries are stored for sharing and reuse.

A domain-specific query language, such as CyQL, provides a key aspect of risk analysis using the disclosed cybersecurity analysis systems (e.g., CyGraph). In terms of the semantics of attack paths, query trajectory through the property graph corresponds to multi-step attack (or attack reachability) through the network. Conceptually, the aspects of CyQL can be organized as shown in FIG. 8.

Figure 8:
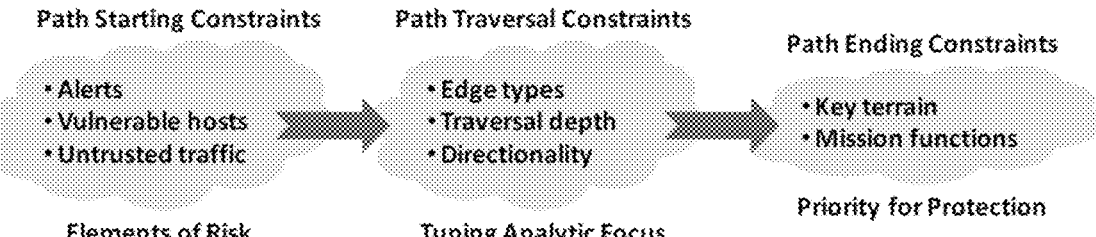
FIG. 8 illustrates exemplary graph trajectory path constraints in a domain-specific query language (e.g., CyGraph Query Language (CyQL)) according to examples of the present disclosure.

The left side of FIG. 8 represents elements of risk within a network (e.g., things to be protected against). By specifying such risk elements as constraints on the starting points of a query traversal, trajectories represent "downstream" relationships emanating from risk points. Conversely, the right side of FIG. 8 represents high-valued assets within the environment (e.g., things to be protected). Defining those high-valued assets as constraints on the traversal ending points cause paths to be focused on those assets as reachable from risky elements. CyQL clauses that occur between these starting and ending extremes generally serve to constrain path trajectories in particular ways (e.g., by edge type, traversal depth, total path length, or directionality) that help tune analytic focus, e.g., for managing the trade-off between comprehensiveness of query results and cognitive overload. By visualizing the results of CyQL queries CyGraph allows users to quickly identify known risky patterns or anomalous structures that warrant further investigation.

For example, given the appropriate data sources, CyQL makes it straightforward to identify the set of hosts with vulnerabilities that reside within the same connected component as a key cyber asset. By limiting the query to vulnerable hosts within two hops of key cyber assets, one can more easily identify the vulnerable hosts that pose the greatest risks. Queries may also help to identify clusters within the graph that have interesting properties. A highly connected cluster of hosts with host-based alerts may be an indication of vigorous adversarial exploration and exploitation.

Figure 9:
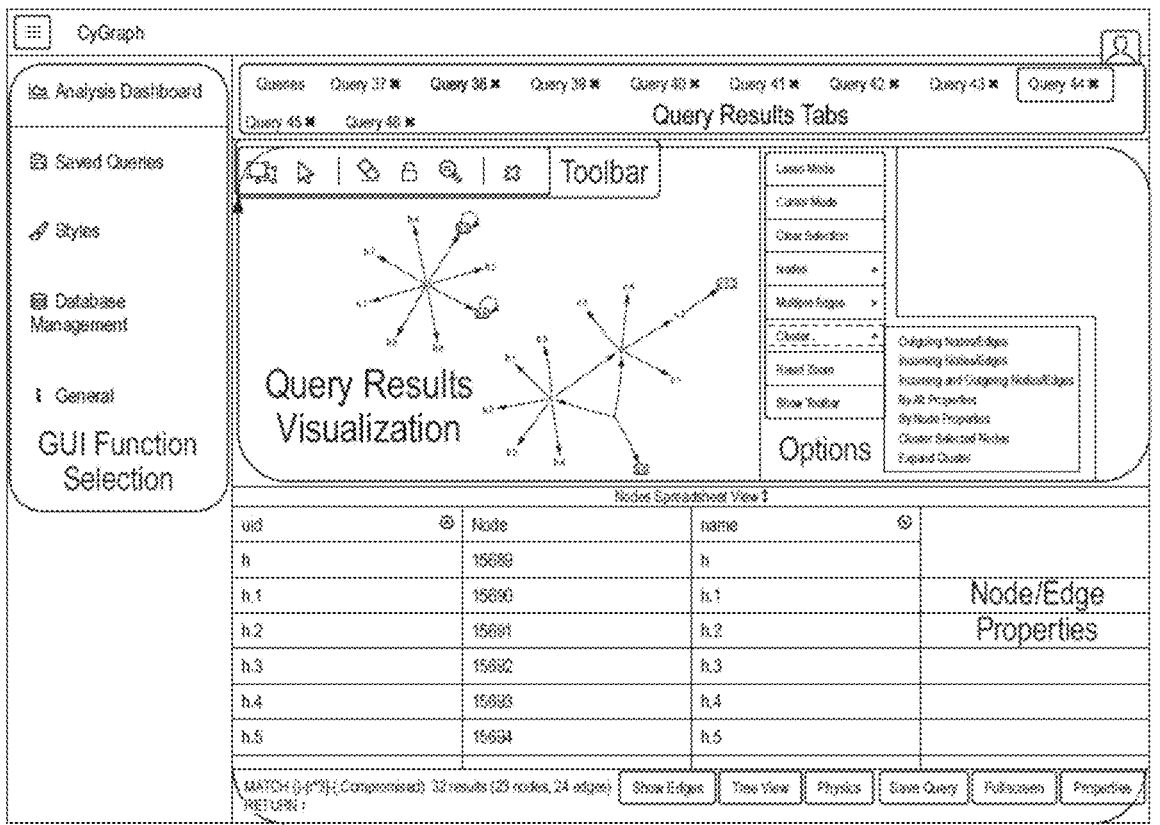
FIG. 9 provides a non-limiting example of a user interface for the disclosed cybersecurity analysis systems.

Once a query has been executed, the disclosed cubersecurity analysis systems (e.g., the CyGraph system) may display the query results in a graphical user interface (GUI) or web browser interface, as illustrated in FIG. 9. The GUI may include, for example, a GUI function selector, a set of query result tabs, a query results visualization panel, an options panel, a node/edge properties table, or any combination thereof. Each query submission creates a new query pane, with tabs for selecting panes. The query results (a matched subgraph) are visualized in a query results visualization panel (or main panel), which may optionally include a toolbar and options table for use in analyzing the query results. Optionally, the unique identifiers (UIDs), node or edge number, node or edge name, and properties for selected nodes or edges are displayed in a table below the graph visualization.

Figure 10A:
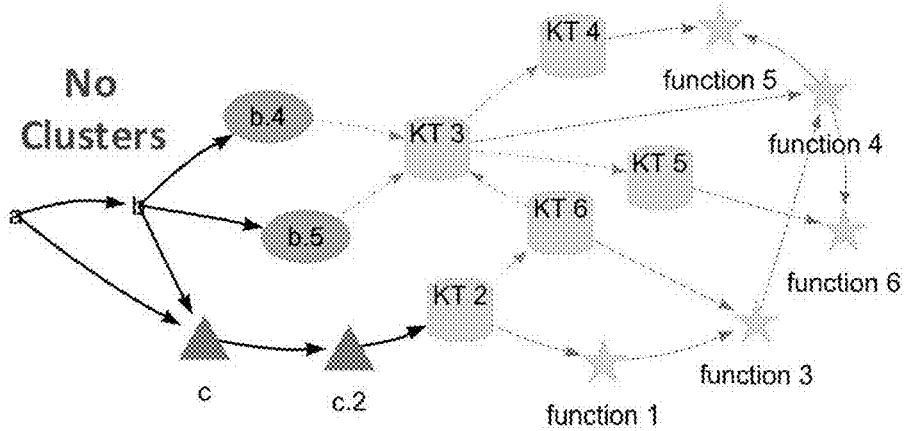
FIGS. 10A-C provide non-limiting examples of clustering elements of the visualized graph generated in the user interface for the disclosed cybersecurity systems.
Figure 10B:
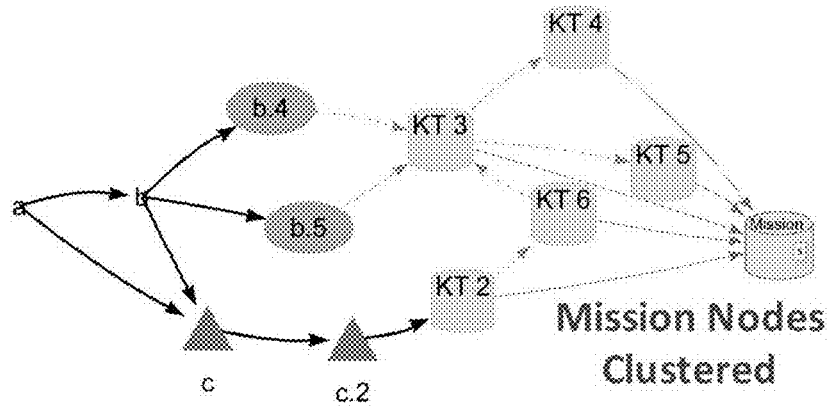
Figure 10C:
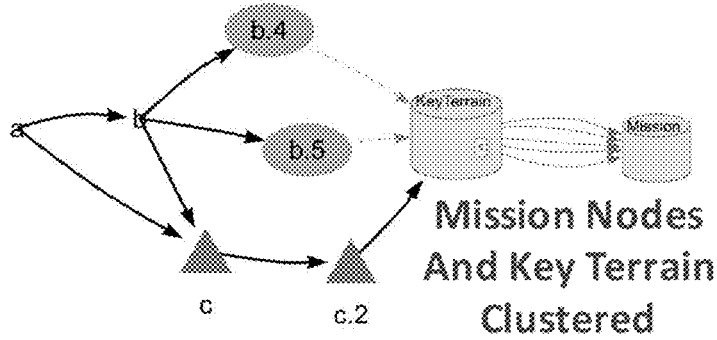

One of the user-interface options is to cluster elements of the visualized graph in particular ways, e.g., by user-selected nodes, incoming and/or outgoing edges for a node, or by node types. A non-limiting example of this is illustrated in FIGS. 10A-C. FIG. 10A illustrates a query result before clustering is applied. The graph model comprises, for example, alert destinations (triangles), vulnerable hosts (ellipses), key terrain nodes (KT2, KT3, KT4, KT5, KT6), and mission function nodes (Function 1, Function 3, Function 4, Function 5, and Function 6). In FIG. 10B, clustering is applied via the node property denoting, e.g., mission functions. In FIG. 10C, additional clustering is applied based on, e.g., the node property denoting key terrain. Visually, such clustering merges a set of nodes to a single displayed node, with adjacent edges to other (non-clustered) nodes preserved. Interactive visual clustering helps manage the complexity of the graph analytics displayed in the user interface. For example, in FIG. 10C, clustering the mission and key terrain nodes helps focus attention on the alert destinations (triangles) and vulnerable hosts (ellipses) that are potential risks.

Figure 11:
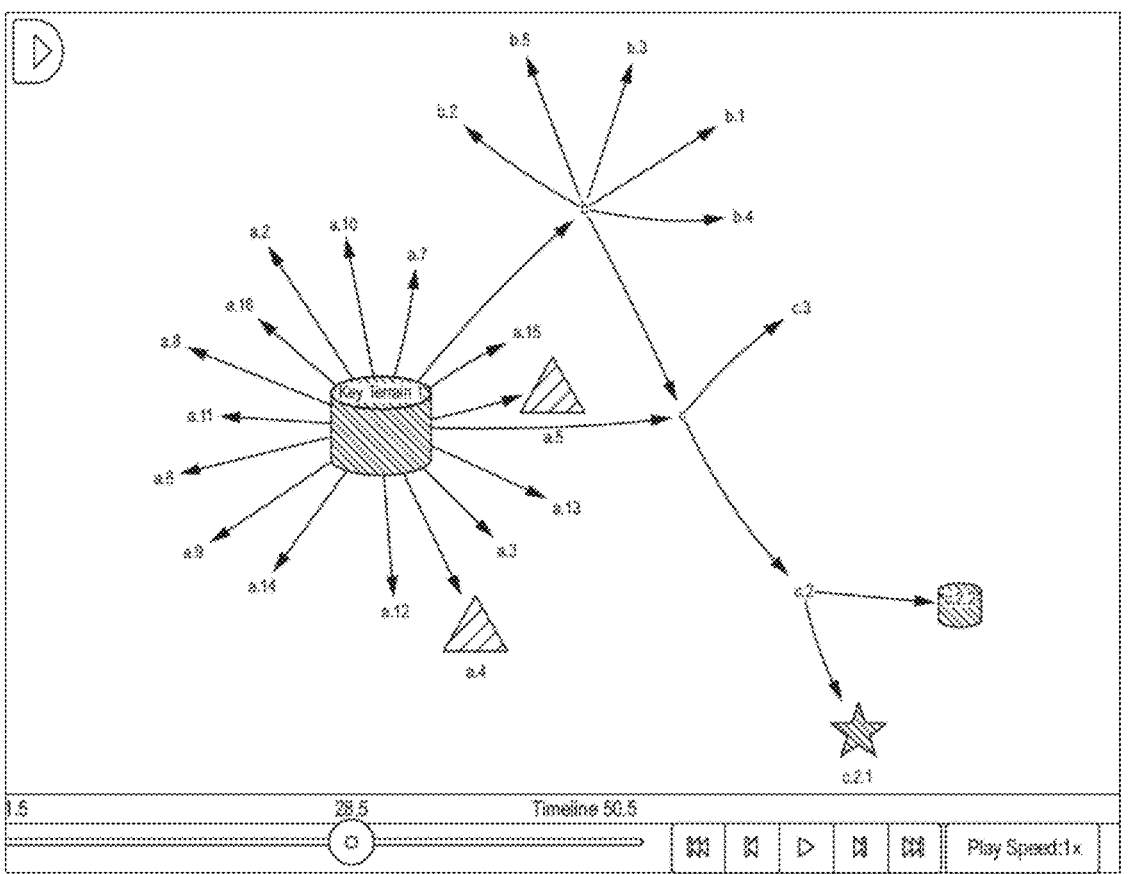
FIG. 11 provides a non-limiting example of a user interface providing an interactive timeline for visualizing graph evolution over time.

For time-varying models, the cybersecurity analysis system (e.g., CyGraph) can provide dynamic visualization of the evolving graph state. A non-limiting example of this is shown in FIG. 11. This capability depends on time stamps being defined for edges during the data ingestion process. Then, when a query result comprising a set of nodes (e.g., a.2-a.16, etc., in FIG. 11) and edges (e.g., connecting arrows in FIG. 11) has a time defined for each edge, the user interface enables the timeline feature, as illustrated in FIG. 11. This feature builds a time tick for each discrete event (e.g., unique value of time in the query result edge set). The user interface then provides timeline video controls (e.g., play, single step forward/back, speed) for displaying the graph as edges appear over time.

Figure 12:
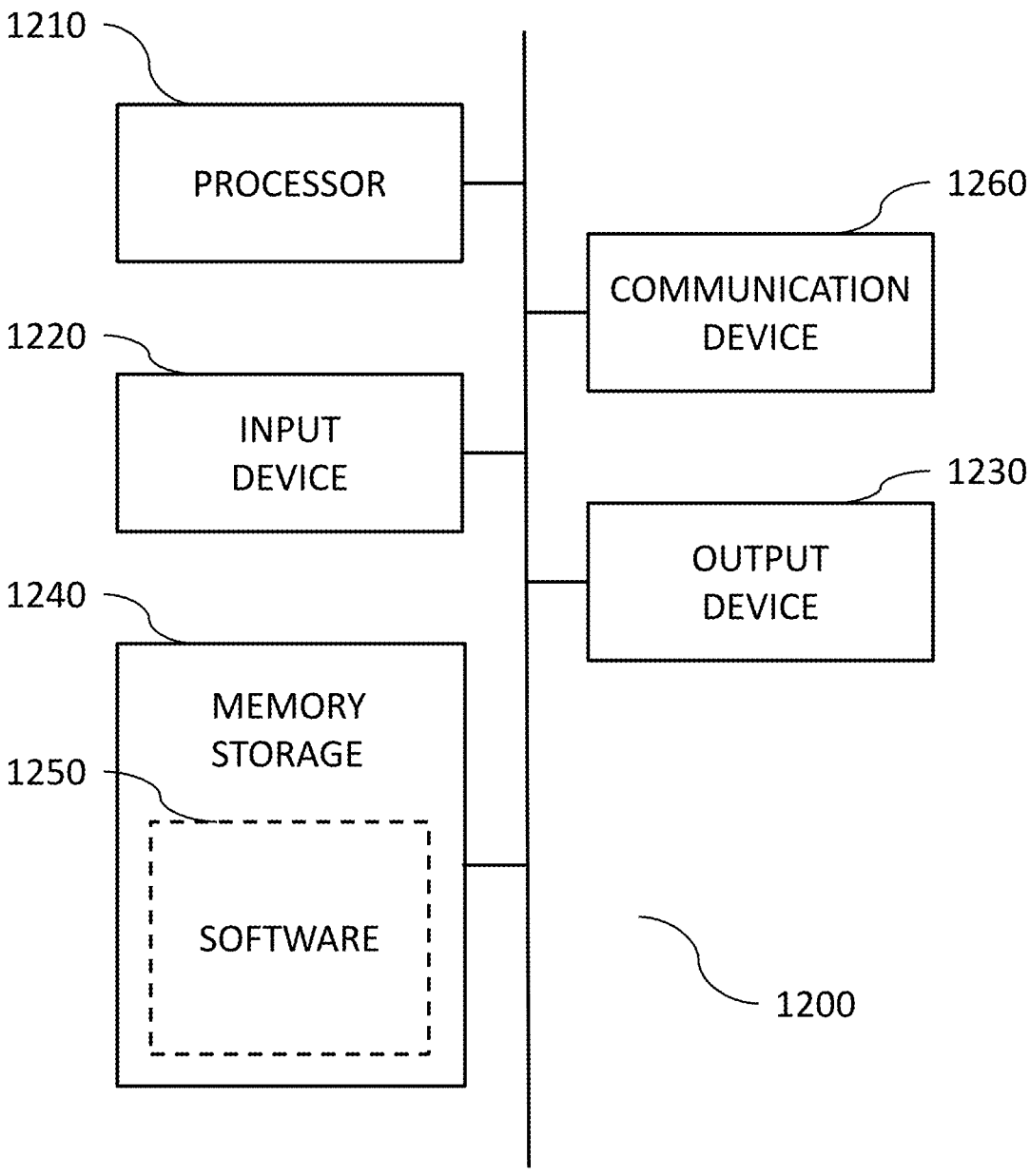
FIG. 12 illustrates an example of a computing system in accordance with one or more examples of the present disclosure.

Computing devices and systems: FIG. 12 illustrates an example of a computing device in accordance with one or more examples of the disclosure. Device 1200 can be a host computer connected to a network. Device 1200 can be a client computer or a server. As shown in FIG. 12, device 1200 can be any suitable type of microprocessor-based device, such as a personal computer, workstation, server, or handheld computing device (portable electronic device), such as a phone or tablet. The device can include, for example, one or more of processor 1210, input device 1220, output device 1230, storage 1240, and communication device 1260. Input device 1220 and output device 1230 can generally correspond to those described above, and they can either be connectable or integrated with the computer.

Input device 1220 can be any suitable device that provides input, such as a touch screen, keyboard or keypad, mouse, or voice-recognition device. Output device 1230 can be any suitable device that provides output, such as a touch screen, haptics device, or speaker.

Storage 1240 can be any suitable device that provides storage, such as an electrical, magnetic, or optical memory including a RAM, cache, hard drive, or removable storage disk. Communication device 1260 can include any suitable device capable of transmitting and receiving signals over a network, such as a network interface chip or device. The components of the computer can be connected in any suitable manner, such as via a physical bus or wirelessly.

Software 1250, which can be stored in memory/storage 1240 and executed by processor 1210, can include, for example, the programming that embodies the functionality of the present disclosure (e.g., as embodied in the devices described above).

Software 1250 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1240, that can contain or store programming for use by or in connection with an instruction execution system, apparatus, or device.

Software 1250 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1200 can implement any operating system suitable for operating on the network. Software 1250 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

EXAMPLES

Example 1—Metrics for Graph Visualization

Figure 13:
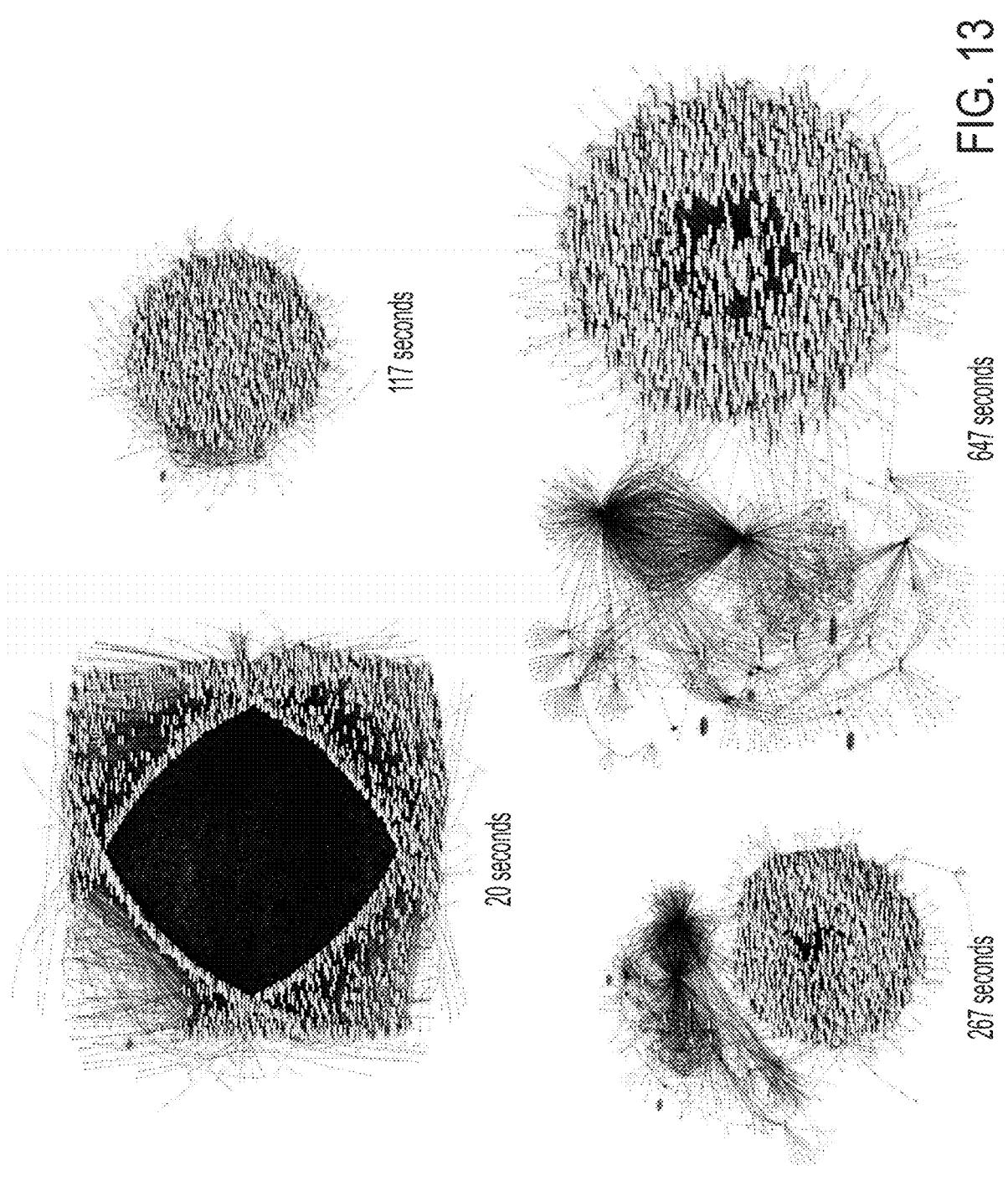
FIG. 13 illustrates exemplary data for node positioning over time for a visualized graph (50,000 elements) in the described cyber-security analysis system.

This example describes metrics for visualizing graphs that match a given cyber network analysis tool user query and demonstrates the speed with which graph queries may be processed and visualized. When a user submits a graph query in the described cyber network analysis tool, the tool creates an interactive visualization of the graph query result. As shown in FIG. 13, the visual rendering is iterative, with the positions of the nodes in a visualized graph being incrementally updated according to a graph drawing algorithm.

Over time, the iterative graph drawing algorithm usually converges, i.e., the node positions are incrementally updated until the magnitudes of their positional changes per time increment fall beneath a given threshold value. For some instances of drawn graphs (e.g., those with overly dense edge connectivity), node positions might not converge for a given threshold. In such cases, it is usually visually apparent that node positions have essentially converged. In either case, the resulting drawn graphs tend to meet certain desired aesthetics, e.g., edges having approximately equal length, minimal crossed edges, etc.

The described cyber network analysis tool implements interactive graph visualizations in its browser user interface through the vis.js JavaScript library. This library applies the Barnes-Hut algorithm for determining the layout (screen coordinates for nodes) in a graph visualization. This algorithm preforms a two-dimensional n-body physics simulation, through an approximation algorithm that has O(n log n) complexity, rather than the O(n$^2$) complexity of an exact solution.

The vis.js library uses the canvas element of HyperText Markup Language version 5 (HTML 5) for dynamic, scriptable rendering of two-dimensional shapes. For interactive graph visualization, HTML canvas has a number of performance advantages over more traditional web-based graphics technologies such as Scalable Vector Graphics (SVG), which is the underlying technology for the popular Data Driven Documents JavaScript library (D3.js).

Figure 14:
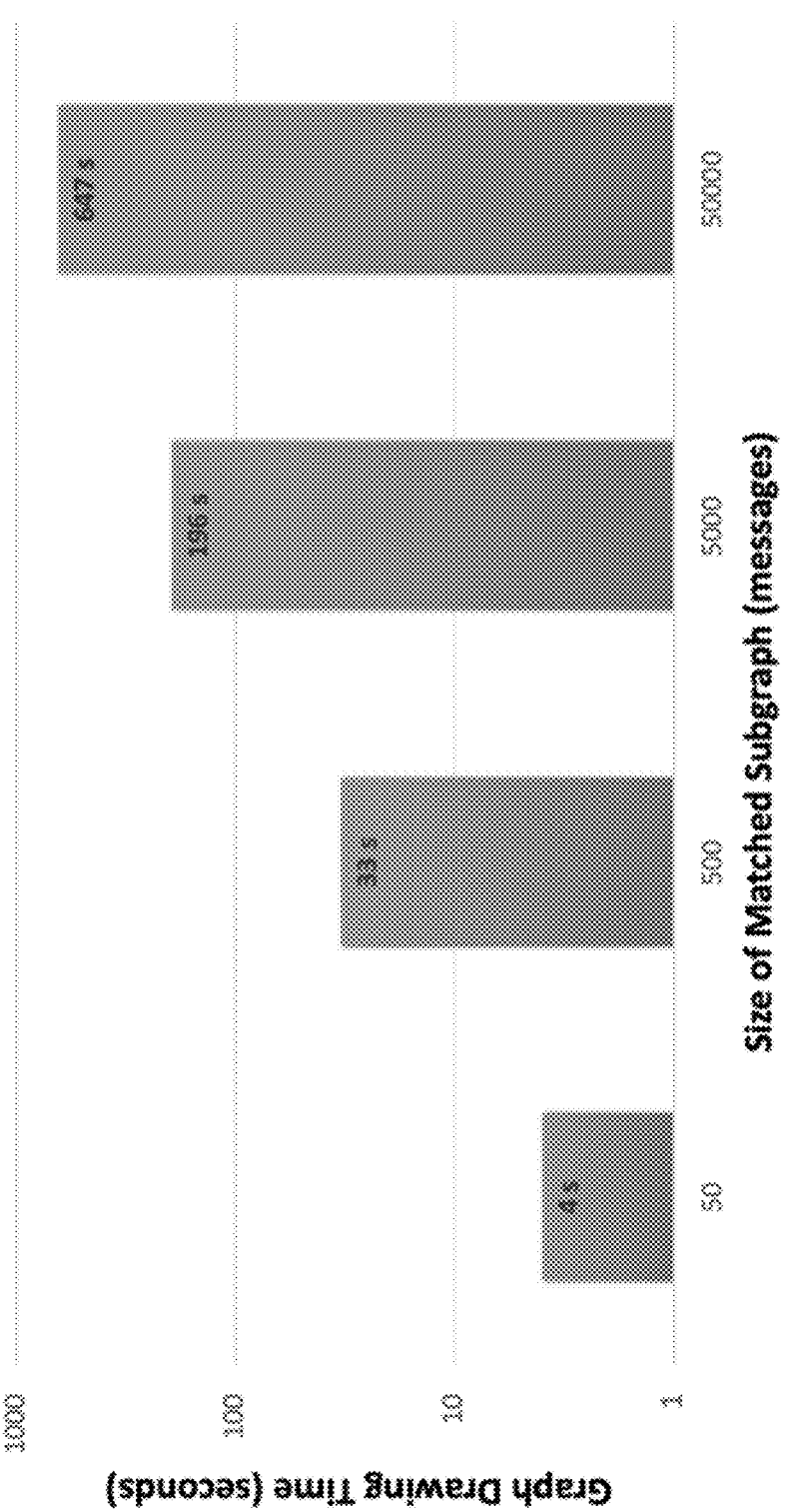
FIG. 14 illustrates exemplary data for execution times for graph drawing convergence in the described cyber-security analysis system.

FIG. 14 shows execution times for the graph drawing algorithm in cyber network analysis tool visualizations for visualized graphs of various sizes, and again demonstrates the speed with which graph queries and visualization of the results may be performed. Here, the execution times are for visualizing subgraphs that match a particular user-submitted graph query. In particular, the reported times in FIG. 14 are the elapsed time between the user submitting the query and the graph drawing algorithm reaching convergence.

The user queries applied in FIG. 14 are of the following form:

MATCH( )–[r]→( )RETURN r LIMIT k

This query pattern, expressed in Neo4j Cypher, matches any edge in the populated cyber network analysis tool graph knowledge base. In this sense, the query graph pattern is arbitrary. The LIMIT k clause restricts the cyber network analysis tool query match result to k records. In FIG. 14, the value of k for a given submitted query appears along the x axis.

For these experiments, the knowledge base is comprised of 6,127 nodes and 12,606 edges, with various properties defined for each node and each edge. The query limit is applied to the number of records in the query match, which are sent from the cyber network analysis tool server to the client user interface (web browser). Because of some redundancy in query match messages versus rendered nodes and edges (e.g., nodes adjacent to multiple edges), the number of potential query result messages is larger than the number of total graph elements.

The cyber network analysis tool supports various user interactions for a visualized graph, such as node repositioning, panning, zooming, etc. Once the graph drawing has converged for a visualized graph, interactive performance (nodes positioning according to user gestures, etc.) is essentially instantaneous. The entire stored graph (all nodes, edges, and their properties) is rendered in the cyber network analysis tool visualization. The values of the node and edge properties are accessible via detail drilldown functions available in the user interface.

Example 2—Metrics for Data Ingestion Latency

This example describes performance metrics regarding the latency for ingesting data from certain key data sources to build cyber network analysis tool graph knowledge bases. The cyber network analysis tool supports continuous ingest of data from various streaming sources. In the data ingest process, the tool is configured as a consumer for a source-specific data stream implemented as a Data Broker topic. The cyber network analysis tool processes each event (Data Broker message) in such a stream, mapping elements of incoming events to corresponding elements (nodes, edges, and node/edge properties) of its graph knowledge base.

Figure 15:
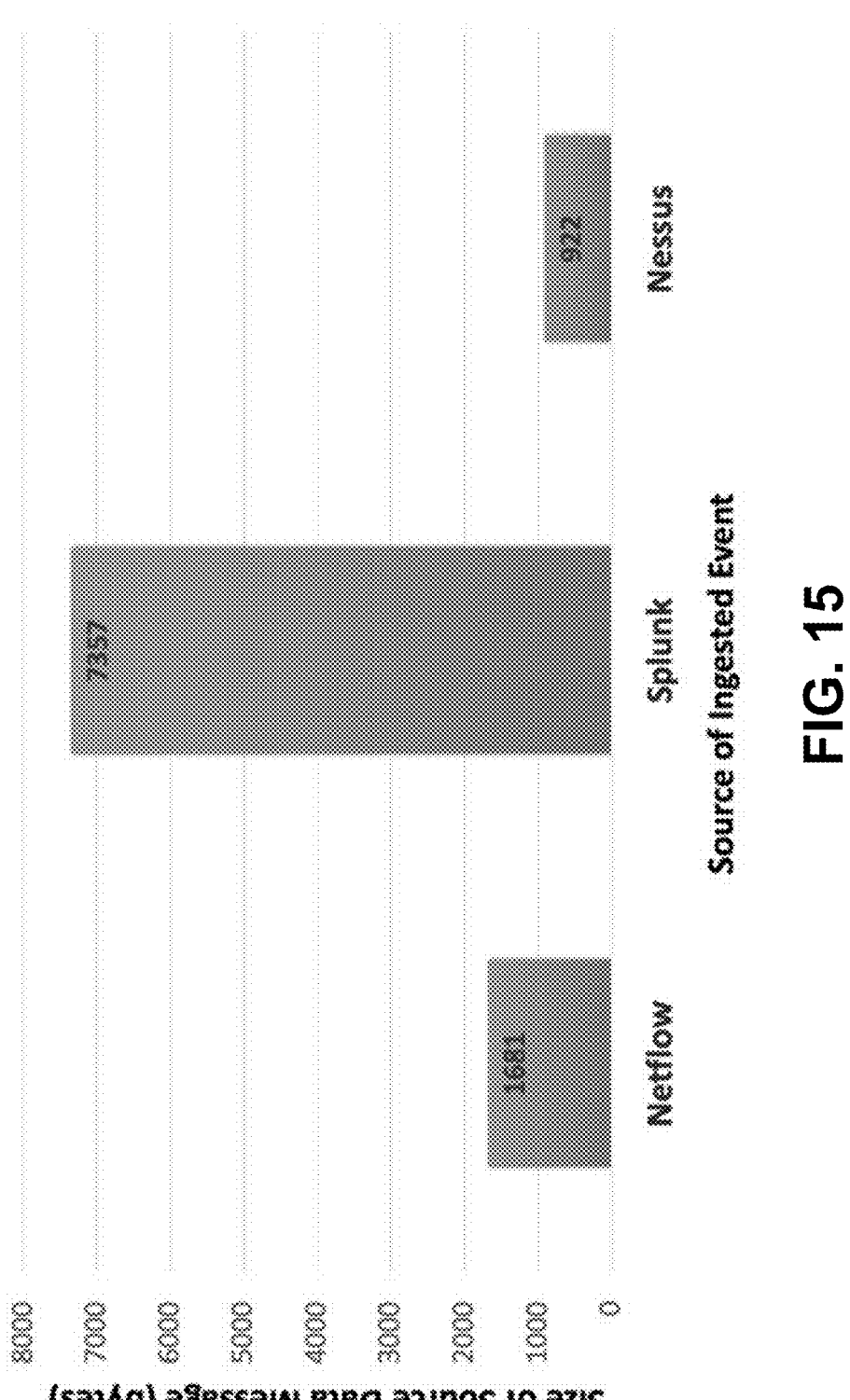
FIG. 15 illustrates exemplary data for representative event message sizes (bytes) for selected ingested data sources.

Examples of key data sources include NetFlow for tracking network traffic communication patterns, Splunk for monitoring intrusion alerts, and Nessus for mapping host vulnerabilities. FIG. 15 shows representative message sizes for events from each of these data sources (i.e., a NetFlow record, Splunk alert, and Nessus vulnerability record, respectively). These are raw message sizes (in bytes), to provide an indication of overall volume of data.

Figure 16:
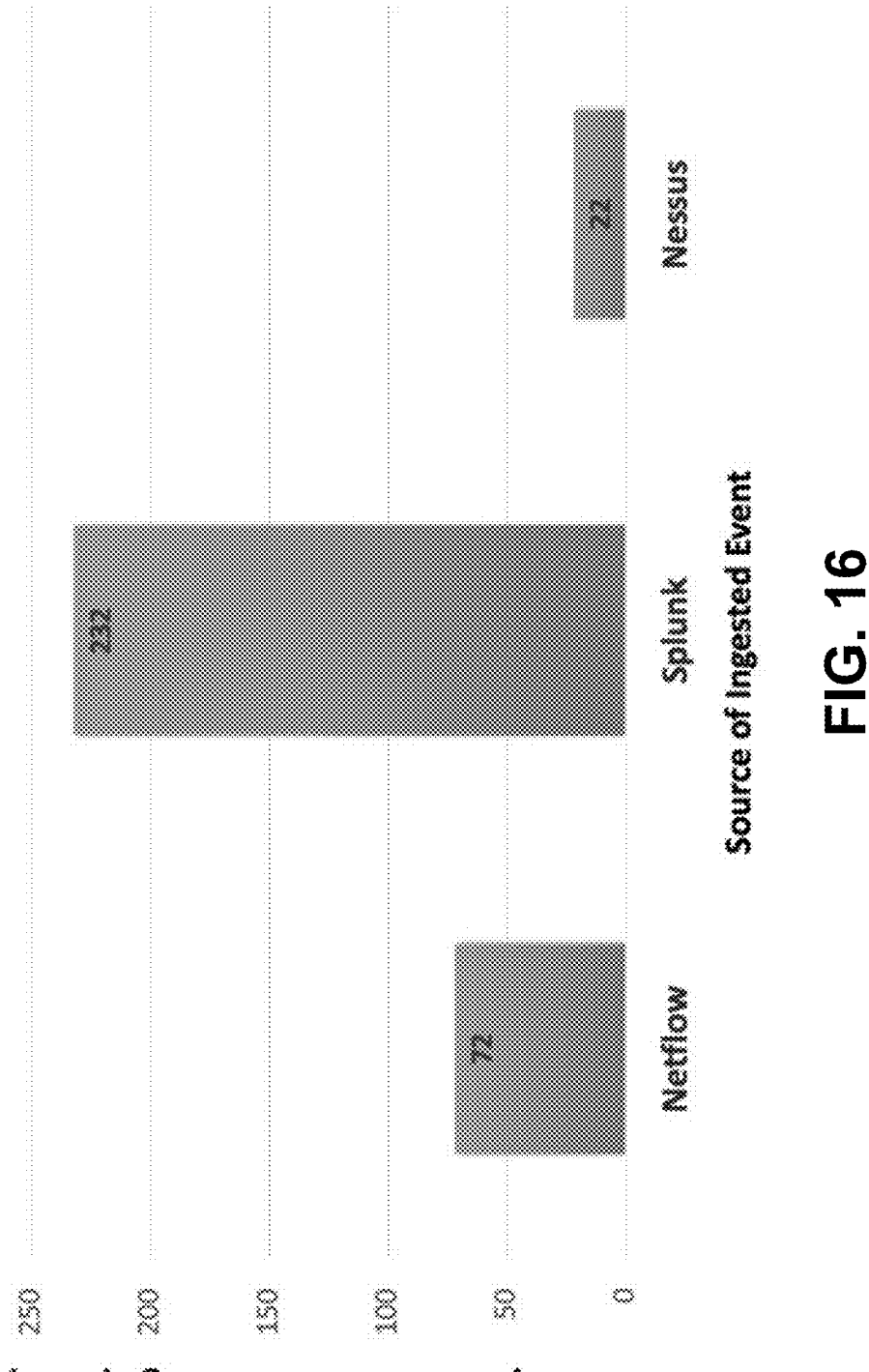
FIG. 16 illustrates exemplary data for representative message cardinality (field count) for selected ingested data sources.

FIG. 16 shows the cardinality (number of data fields) for events of each source data type. The numbers of fields (key/value pairs) for each type of event correlate strongly with their corresponding overall message size. Thus, the average size (bytes) per field is similar across all the source types.

Figures 17A, 17B, 17C:
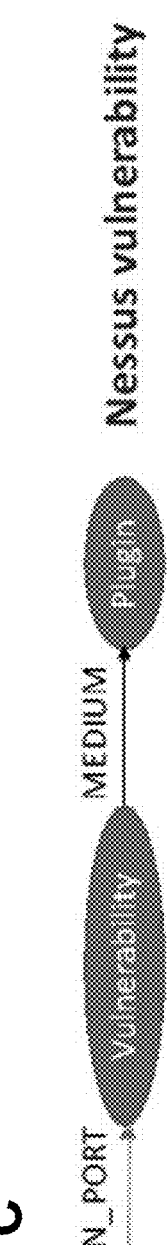
FIGS. 17A-C illustrate exemplary graph patterns from selected ingested data sources.

FIGS. 17A-C show the basic graph patterns resulting from the cyber network analysis tool ingest of events from each of these key data sources. As shown in FIG. 17A, a NetFlow event (flow record) corresponds to cyber network analysis tool nodes for the source and destination internet protocol (IP) addresses, with an edge representing the set of all flow records from a source IP to a destination IP. As shown in FIG. 17B, a Splunk event (alert) corresponds to a node (IP address) for the host exhibiting the alert, a node for the alert itself, and an edge associating the alert with the host. A Nessus event (vulnerability record) corresponds to three nodes and two edges, as shown in FIG. 17C. A host (IP address) node is associated with a vulnerability detected on a particular host port. The vulnerability instance is associated with a Nessus plugin identifier node, which records various details for testing the particular vulnerability.

Figure 18:
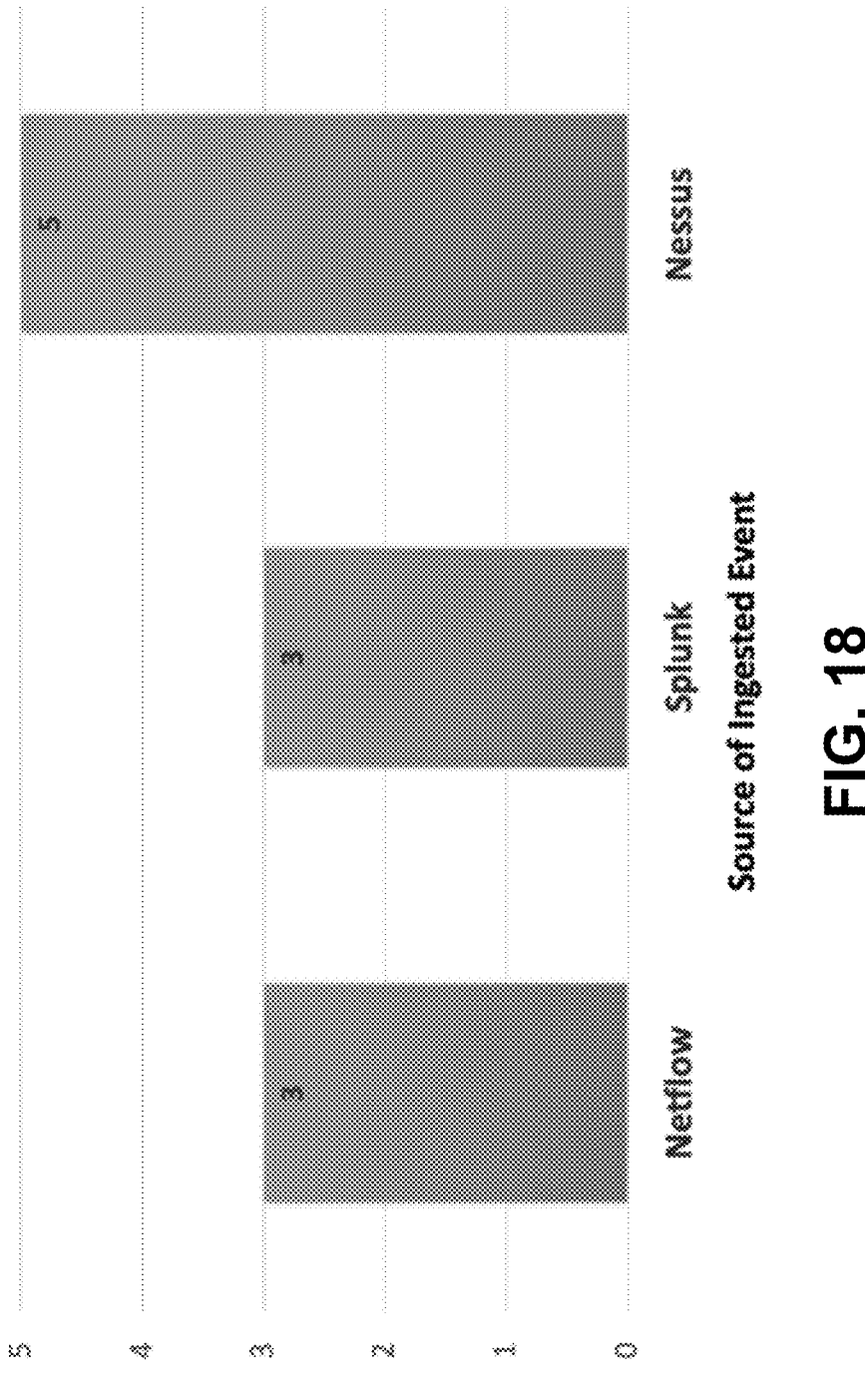
FIG. 18 illustrates exemplary data for the number of graph update messages for events of selected source data types.

In the initial stage of cyber network analysis tool streaming data ingest, custom stream loaders developed for each data source create a set of graph update messages to be subsequently processed in a generic (source independent) way. FIG. 18 shows the number of graph update messages created by the corresponding stream loader for an event of each type (NetFlow, Splunk, and Nessus). These correspond to the two nodes and one edge for NetFlow and Splunk events (a total of three graph update messages, respectively) and the three nodes and two edges for Nessus events (a total of five messages).

Figure 19:
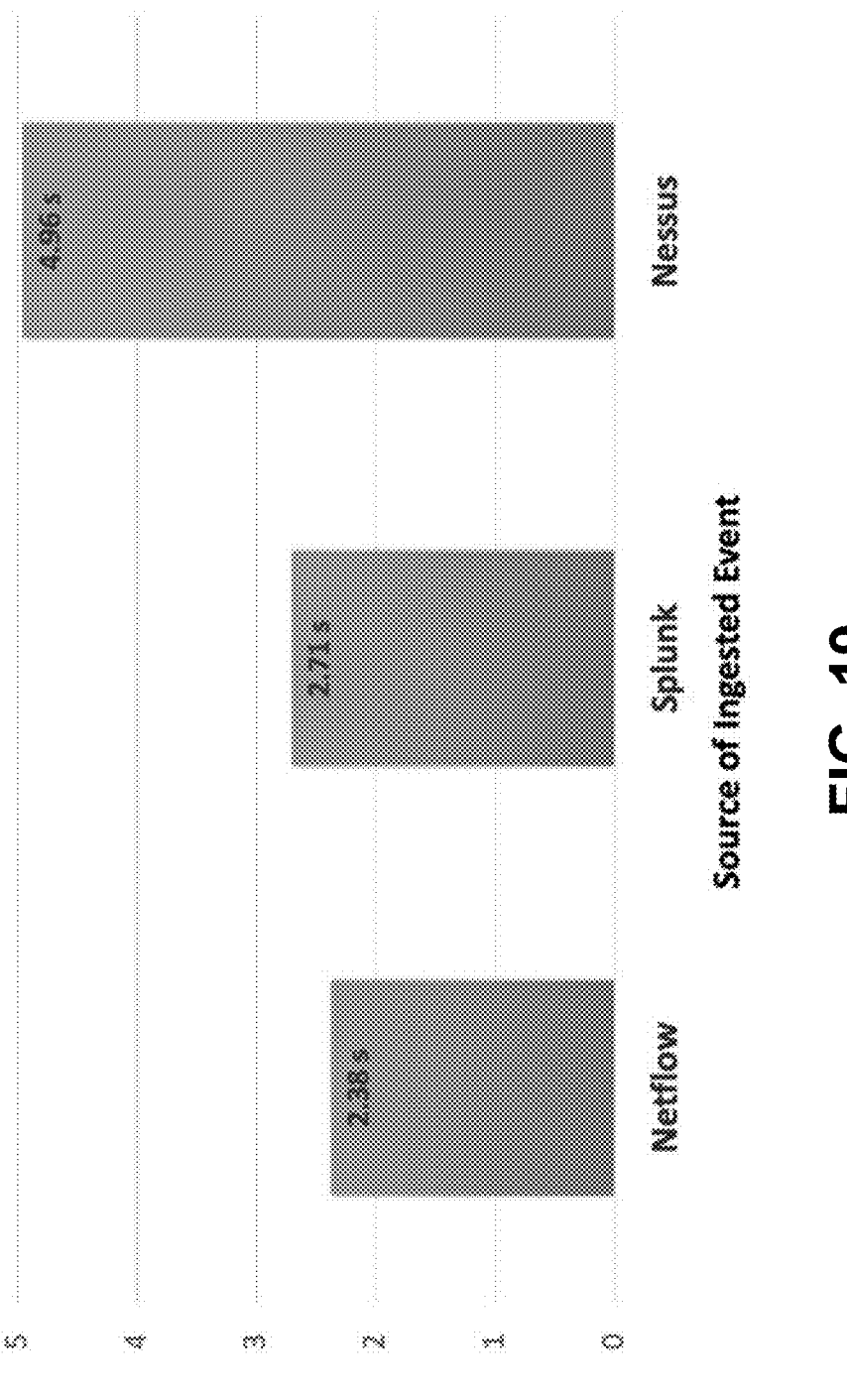
FIG. 19 illustrates exemplary data for the processing latency for events of selected source data types.

FIG. 19 shows the computation times required for full end-to-end processing of a representative event from each of the key source data types (NetFlow, Splunk, and Nessus). Each value is the overall processing time, starting from the receipt of a source data event message from the corresponding Data Broker topic (the beginning of data ingest) until the final graph update message for that event is processed (the completion of data ingest). These times thus represent the latency between receiving the event from Data Broker until it the event data is merged into the cyber network analysis tool graph knowledge base, i.e., available for querying within the tool itself or serving as a triggering event for external systems integrated with the cyber network analysis tool (e.g., dashboard updates) and demonstrate the near real-time performance of the system.

The latency times in FIG. 19 correlate strongly with the numbers of graph update messages in FIG. 18, suggesting that data ingest time is dominated by the number of graph updates per ingested data source event. Notably, data ingest for Nessus has the greatest latency, even though the Nessus event has the smallest message size and fewest fields (FIG. 15 and FIG. 16 respectively). In comparing latency times for NetFlow and Splunk (which both correspond to three graph update events), their slight variation correlates with message sizes (FIG. 15) and field counts (FIG. 16) for their respective input messages.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for assessing a computer network using a graph model comprising:

receiving data from a plurality of data streams, wherein each of the plurality of data streams is received from an associated data broker and comprises computer network data from a plurality of network sensors, and wherein the data received from different data streams of the plurality of data streams comprise different data formats;

converting, using a first conversion module corresponding to a first data format of the different data formats and configured to receive a first data stream of the plurality of data streams, data from the first data stream to a first converted dataset comprising a graph database format of a graph database comprising a first node or a first edge, wherein the data from the first data stream comprises data of the first format received from an associated first plurality of network sensors;

converting, using a second conversion module corresponding to a second data format of the different data formats and configured to receive a second data stream of the plurality of data streams, data from the second data stream to a second converted data set comprising the graph database format of the graph database comprising a second node or a second edge, wherein the data from the second data stream comprises data of the second format received from an associated second plurality of network sensors;

updating a graph model comprising a plurality of nodes and edges stored within the graph database according to at least one of the first node, the second node, the first edge, and the second edge of the first converted dataset and the second converted dataset, wherein the graph model is updated based on predefined levels of priority associated with a type or a property of the converted data, and wherein the predefined levels of priority govern whether the converted data modifies an existing node or edge of the graph model;

generating an interactive user interface comprising a user-modifiable visualization of the graph model;

receiving a user input via the interactive user interface, wherein the user input comprises a clustering instruction for managing complexity of the visualization of the graph model, the clustering instruction associated with at least one node property; and managing complexity of the visualization of the graph model based on the clustering instruction by:

identifying a plurality of nodes associated with the at least one node property, and displaying the plurality of nodes associated with the at least one node property as a single displayed node and displaying a plurality of non-clustered nodes in association with the single displayed node such that relationships between the non-clustered nodes and the plurality of nodes associated with the at least one node property are preserved.

2. The method of claim 1, wherein the data received from the plurality of data streams is received on an intermittent basis.

3. The method of claim 1, wherein the data received from the plurality of data streams comprises data indicating a present state of the computer network.

4. The method of claim 1, wherein the plurality of data streams comprise a network infrastructure data stream, a network information flow data stream, a network vulnerability scan data stream, a network intrusion detection alert data stream, a network mission dependencies data stream, an arbitrary data stream, or any combination thereof.

5. The method of claim 1, wherein converting the received data to the graph database format is performed independently of existing graph models stored within the graph database.

6. The method of claim 1, wherein a node comprises information about a network device, a network computer, a network machine, a network cyberspace asset, a network domain, a network rule, a network mission objective, a network mission asset, a network mission task, a network alert, a network vulnerability state, a network vulnerability score, a cyberattack classification, an organization, a user, a geographical area, or any combination thereof.

7. The method of claim 1, wherein the graph database format for at least one of the first node and the second node comprises a unique identifier (UID), a category description, a display name description, one or more key-value property fields, and an aggregation field.

8. The method of claim 7, wherein the aggregation field comprises instructions for modifying the one or more key-value property fields of a corresponding node within the graph model when at least one of the first node and the second node is integrated with the graph model.

9. The method of claim 1, wherein an edge comprises information about a relationship between a starting node and a destination node.

10. The method of claim 1, wherein the graph database format for an edge comprises a unique identifier (UID), a category description, a display name description, a starting node UID, a destination node UID, one or more key-value property fields, and an aggregation field.

11. The method of claim 1, wherein updating the graph model comprises adding at least one of the first node, the second node, the first edge, and the second edge of the first converted dataset and the second converted dataset.

12. The method of claim 1, wherein updating the graph model comprises deleting a node or edge of the plurality of nodes and edges stored within the graph model that corresponds to at least one of the first node, the second node, the first edge, and the second edge of the first converted dataset and the second converted dataset.

13. The method of claim 1, wherein updating the graph model comprises modifying a property associated with a node or edge of the plurality of nodes and edges stored within the graph model according to that of at least one of the first node, the second node, the first edge, and the second edge of the first converted dataset and the second converted dataset.

14. The method of claim 1, wherein the graph model is updated based on a precedence table, wherein the precedence table defines levels of priority associated with a type or a property of the first converted dataset and the second converted dataset.

15. The method of claim 1, wherein updating the graph model comprises:

comparing a node type of the first node to a node type of a corresponding node in the graph model;

determining a relative importance between the node type of the first node and the node type of the corresponding node; and modifying the corresponding node based on the relative importance of the node type first node and the node type of the corresponding node.

16. The method of claim 1, wherein the clustering instruction comprises a selection of the least one node property and identifying the plurality of nodes associated with the at least one node property comprises identifying a plurality of nodes comprising the at least one node property selected by the user.

17. A computing system for assessing a computer network using a graph database, comprising:

one or more data input devices configured to receive data from a plurality of data streams;

one or more processors;

memory; and one or more programs stored in the memory that, when executed by the one or more processors, cause the one or more processors to perform a method comprising:

receiving the data from the plurality of data streams, wherein each of the plurality of data streams is received from an associated data broker and comprises computer network data from a plurality of network sensors, and wherein the data received from different data streams of the plurality of data streams comprise a plurality of different data formats;

converting, using a first conversion module corresponding to a first data format of the different data formats and configured to receive a first data stream of the plurality of data streams, data from the first data stream to a first converted dataset comprising a graph database format comprising a first node or a first edge, wherein the data from the first data stream comprises data of the first format received from an associated first plurality of network sensors;

converting, using a second conversion module corresponding to a second data format of the different data formats and configured to receive a second data stream of the plurality of data streams, data from the second data stream to a second converted dataset comprising the graph database format comprising a second node or a second edge, wherein the data from the second data stream comprises data of the second format received from an associated second plurality of network sensors;

updating a graph model comprising a plurality of nodes and edges stored within the graph database according to at least one of the first node, the second node, the first edge, and second edge of the first converted dataset and the second converted dataset, wherein the graph model is updated based on predefined levels of priority associated with a type or a property of the converted data, and wherein the predefined levels of priority govern whether the converted data modifies an existing node or edge of the graph model;

generating an interactive user interface comprising a user-modifiable visualization of the graph model;

receiving a user input via the interactive user interface, wherein the user input comprises a clustering instruction for managing complexity of the visualization of the graph model, the clustering instruction associated with at least one node property; and managing complexity of the visualization of the graph model based on the clustering instruction by:

identifying a plurality of nodes associated with the at least one node property, and displaying the plurality of nodes associated with the at least one node property as a single displayed node and displaying a plurality of non-clustered nodes in association with the single displayed node such that relationships between the non-clustered nodes and the plurality of nodes associated with the at least one node property are preserved.

18. The computing system of claim 17, wherein the data received from the plurality of data streams is received on an intermittent basis.

19. The computing system of claim 17, wherein the data received from the plurality of data streams comprises data indicating a present state of the computer network.

20. The computing system of claim 17, wherein the plurality of data streams comprise a network infrastructure data stream, a network information flow data stream, a network vulnerability scan data stream, a network intrusion detection alert data stream, a network mission dependencies data stream, an arbitrary data stream, or any combination thereof.

21. The computing system of claim 20, wherein converting the received data to the graph database format is performed independently of existing graph models stored within the graph database.

22. The computing system of claim 17, wherein the a node comprises information about a network device, a network computer, a network machine, a network cyberspace asset, a network domain, a network rule, a network mission objective, a network mission asset, a network mission task, a network alert, a network vulnerability state, a network vulnerability score, a cyberattack classification, an organization, a user, a geographical area, or any combination thereof.

23. The computer system of claim 17, wherein an edge comprises information about a relationship between a starting node and a destination node.

24. The computer system of claim 17, wherein updating the graph model comprises an action selected from the group consisting of adding at least one of the first node, the second node, the first edge, and the second edge of the first converted dataset and the second converted dataset, deleting a node or edge of the plurality of nodes and edges stored within the graph model that corresponds to at least one of the first node, the second node, the first edge, and the second edge of the first converted dataset and the second converted dataset, or modifying a property associated with a node or edge of the plurality of nodes and edges stored within the graph model according to that of at least one of the first node, the second node, the first edge, and the second edge of the first converted dataset and the second converted dataset.

25. The computing system of claim 17, wherein the graph model comprises a plurality of layers, each layer associated with a type of computer-network information and comprising a subset of the plurality of nodes and edges in the graph model.

26. The computing system of claim 25, wherein the method further comprises sending an alert to the user of the computer network when the graph model has been updated.

27. The computing system of claim 26, wherein the method further comprises receiving a domain-specific data query from the user of the computer network.

28. The computing system of claim 27, wherein the method further comprises converting the received domain-specific data query to a graph database native query that, when executed upon the graph database, returns matching subgraphs from the plurality of layers of the graph model.

29. The computing system of claim 28, wherein the method further comprises providing the user of the computer network with a visualization of the returned matching subgraphs from across the layers of the graph model.

30. The computing system of claim 17, wherein the method further comprises allowing the user of the computer network to select a graph dataset from a plurality of graph datasets associated with the graph database.

31. A non-transitory computer readable storage medium having stored thereon a set of instructions for assessing a computer network using a graph database that, when executed by a computing system, cause the computing system to:

receive data from a plurality of data streams, wherein each of the plurality of data streams received from an associated data broker by and comprises computer network data from a plurality of network sensors, and wherein the data received from different data streams of the plurality of data streams comprise a plurality of different data formats;

convert, using a first conversion module corresponding to a first data format of the different data formats and configured to receive a first data stream of the plurality of data stream, data from the first data stream to a first converted dataset comprising a graph database format comprising a first node or a first edge, wherein the data from the first data stream comprises data of the first format received from an associated first plurality of network sensors;

convert, using a second conversion module corresponding to a second data format of the different data formats and configured to receive a second data stream of the plurality of data streams, data from the second data stream to a second converted dataset comprising the graph database format comprising a second node or a second edge, wherein the data from the second data stream comprises data of the second format received from an associated second plurality of network sensors;

update a graph model comprising a plurality of nodes and edges stored within the graph database according to at least one of the first node, the second node, the first edge, and the second edge of the first converted dataset and the second converted dataset, wherein the graph model is updated based on predefined levels of priority associated with a type or a property of the converted data, and wherein the predefined levels of priority govern whether the converted data modifies an existing node or edge of the graph model;

generate an interactive user interface comprising a user-modifiable visualization of the graph model;

receive a user input via the interactive user interface, wherein the user input comprises a clustering instruction for managing complexity of the visualization of the graph model, the clustering instruction associated with at least one node property; and managing complexity of the visualization of the graph model based on the clustering instruction by:

identifying a plurality of nodes associated with the at least one node property, and displaying the plurality of nodes associated with the at least one node property as a single displayed node and displaying a plurality of non-clustered nodes in association with the single displayed node such that relationships between the non-clustered nodes and the plurality of nodes associated with the at least one node property are preserved.

* * * * *